INVENTORS
JAMES W. BRYCE, DECEASED,
BY ELIZABETH SNOW BRYCE AND THE NATIONAL
NEWARK AND ESSEX BANKING CO. OF
NEWARK, EXECUTORS.
ARTHUR H. DICKINSON
BY Robert S. Dunham
ATTORNEY July 15, 1952 J. W. BRYCE ET AL 2,603,416
SUMMARY CARD PUNCH AND COLLATOR
Filed Aug. 13, 1949 12 Sheets-Sheet 4

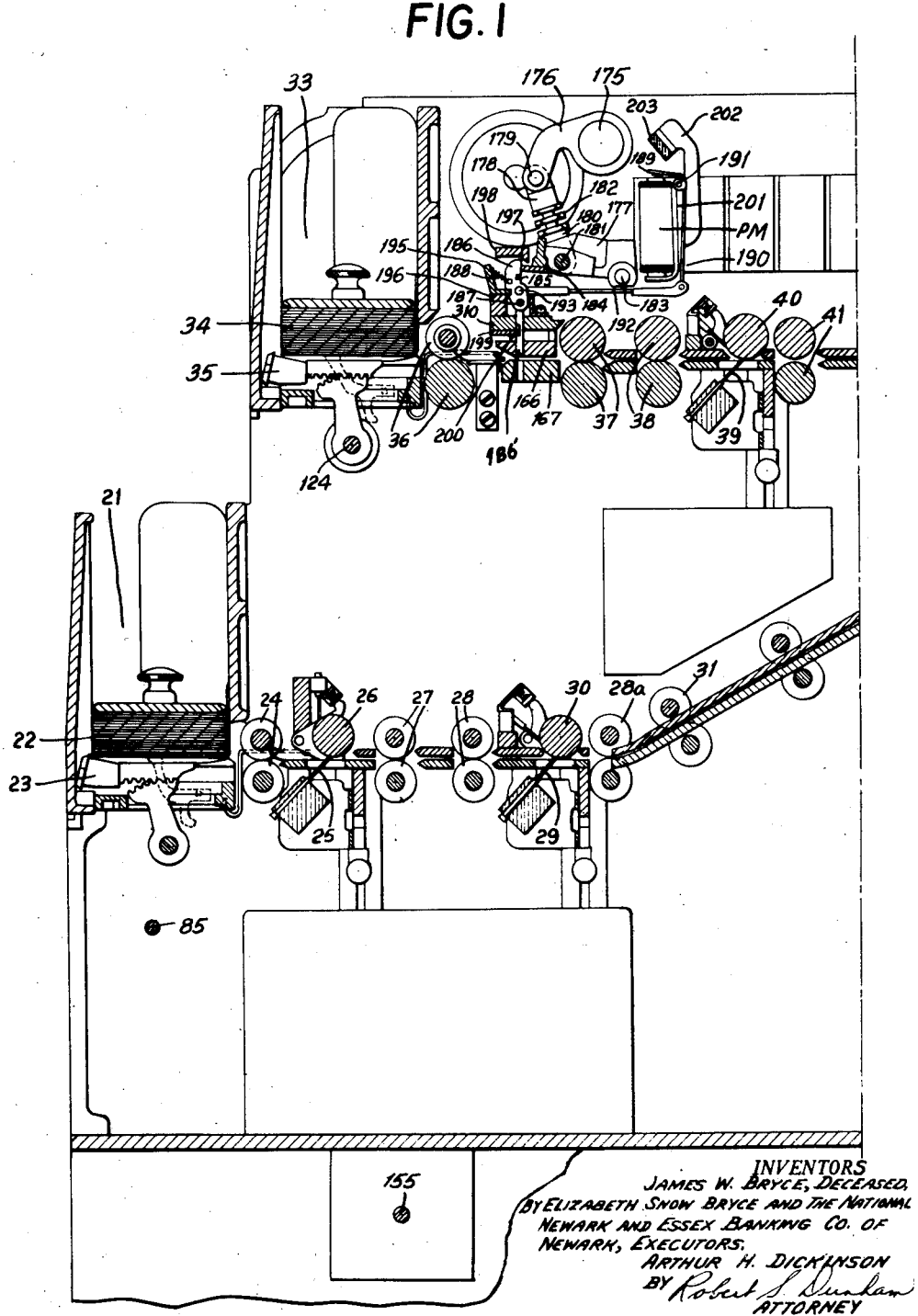

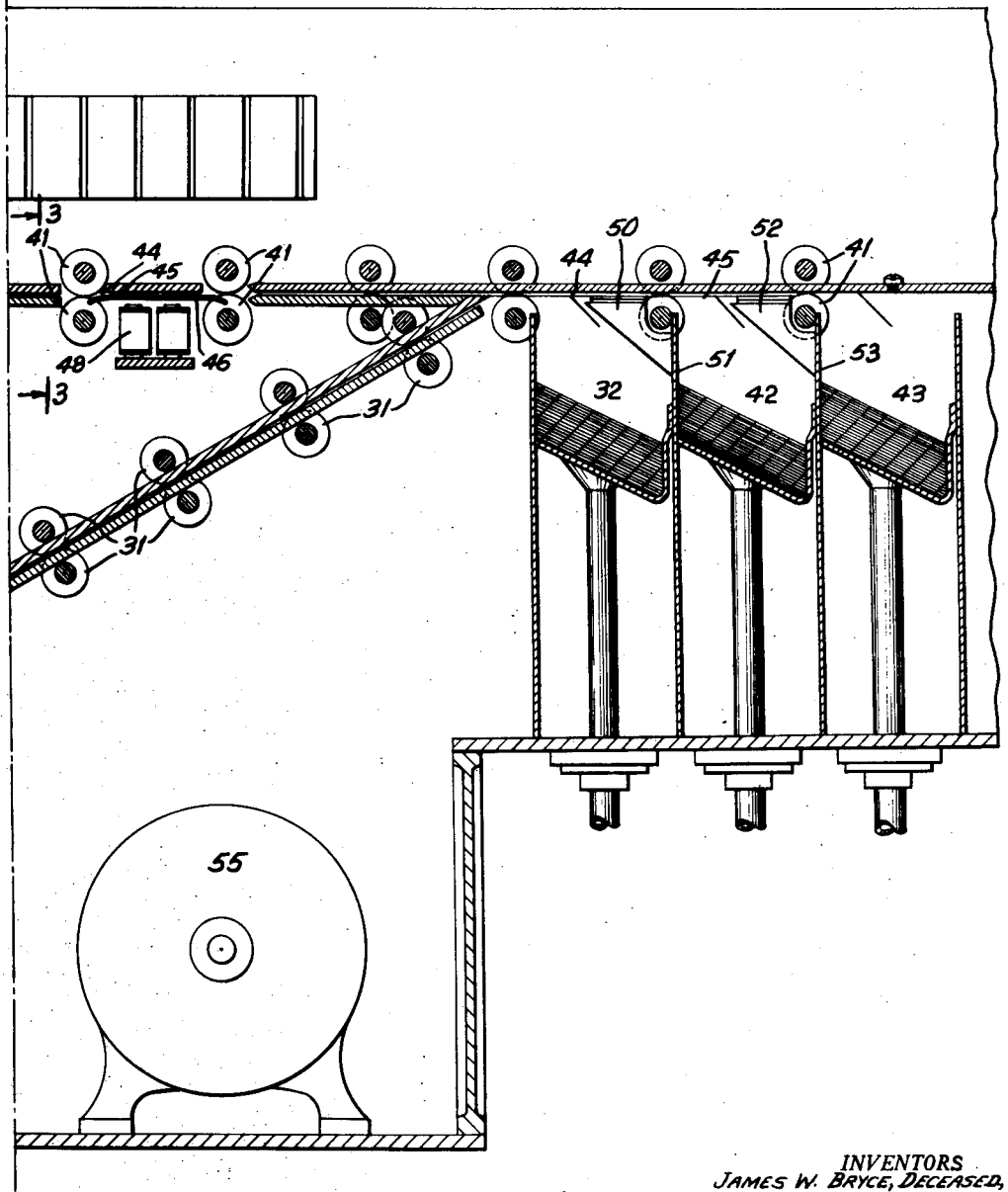

INVENTORS
JAMES W. BRYCE, DECEASED,
BY ELIZABETH SNOW BRYCE AND THE NATIONAL
NEWARK AND ESSEX BANKING CO. OF
NEWARK, EXECUTORS
ARTHUR H. DICKINSON
BY Robert S. Dunham
ATTORNEY

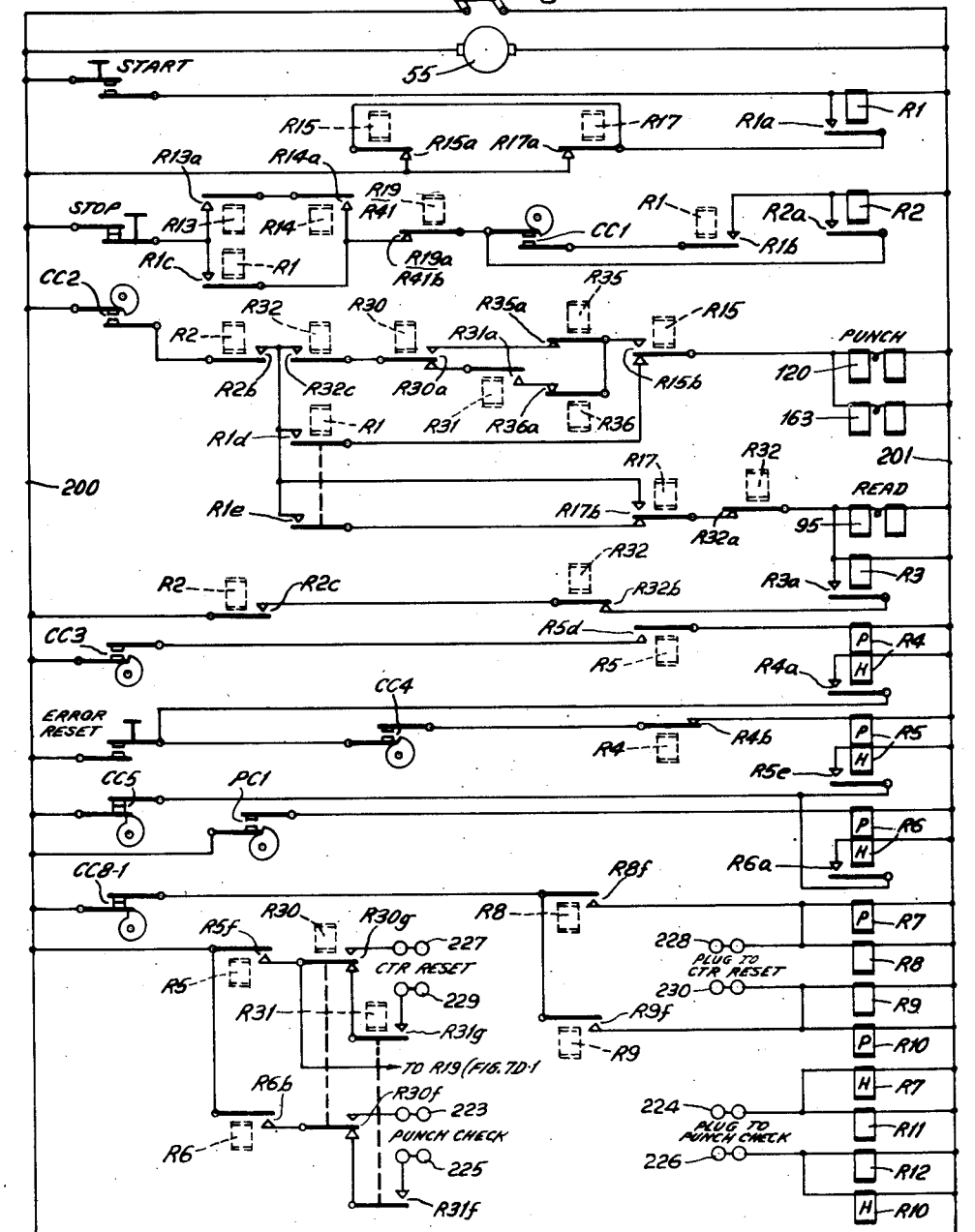

July 15, 1952     J. W. BRYCE ET AL     2,603,416

SUMMARY CARD PUNCH AND COLLATOR

Filed Aug. 13, 1949     12 Sheets-Sheet 6

INVENTORS
JAMES W. BRYCE, DECEASED,
BY ELIZABETH SNOW BRYCE AND THE NATIONAL
NEWARK AND ESSEX BANKING CO. OF
NEWARK, EXECUTORS.
ARTHUR H. DICKINSON
BY Robert S. Dunham
ATTORNEY

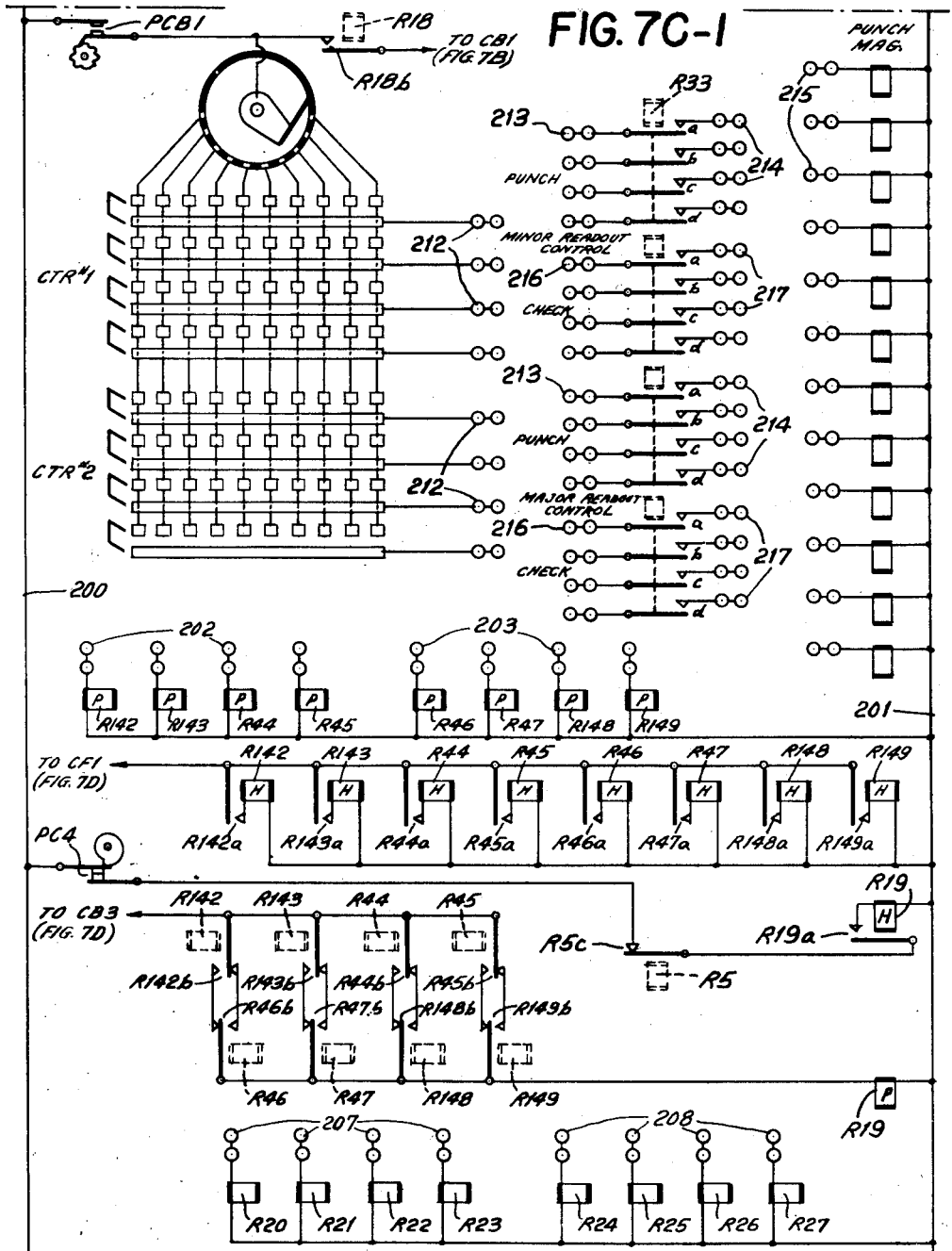

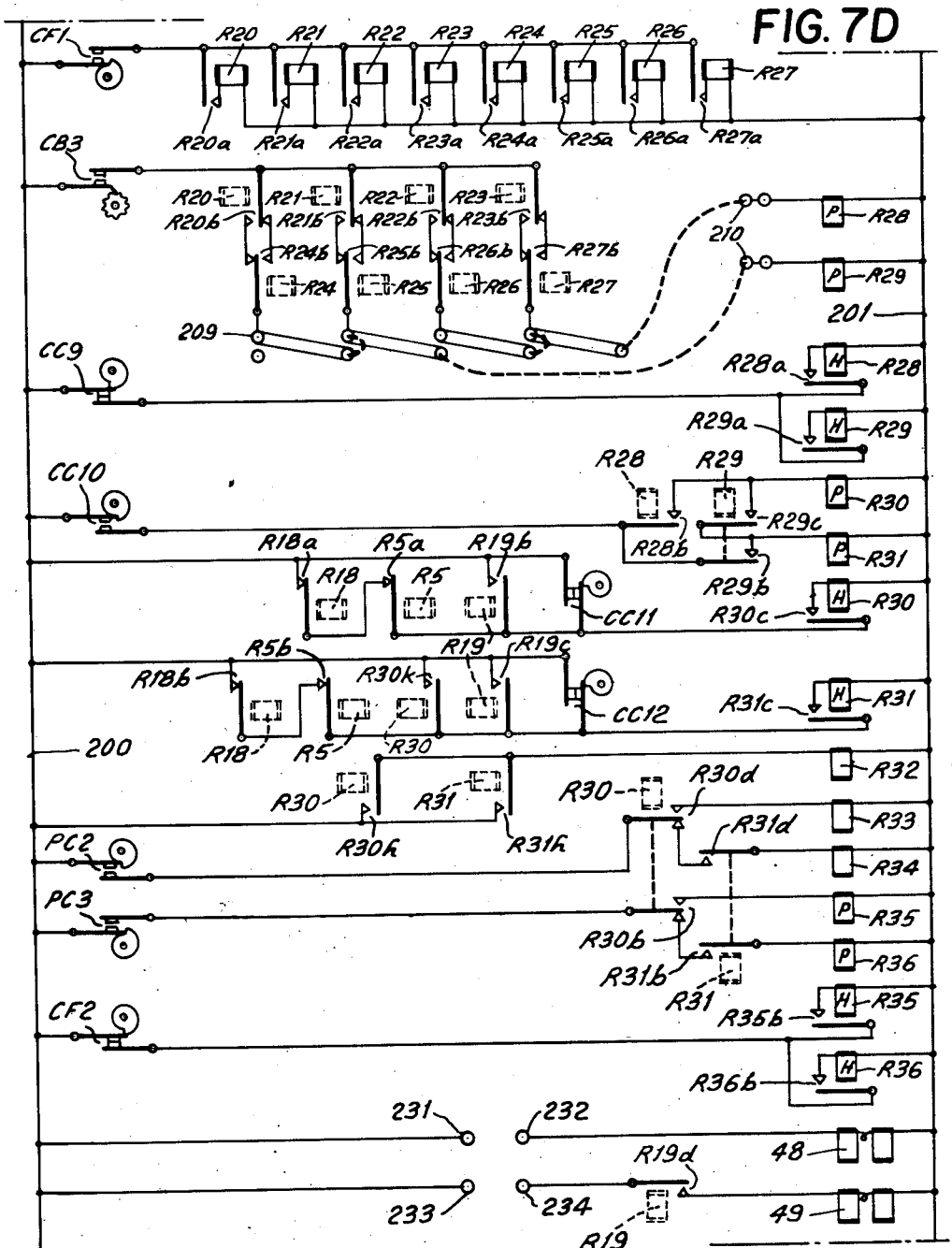

July 15, 1952  J. W. BRYCE ET AL  2,603,416
SUMMARY CARD PUNCH AND COLLATOR
Filed Aug. 13, 1949  12 Sheets-Sheet 12

INVENTORS
JAMES W. BRYCE, DECEASED.
BY ELIZABETH SNOW BRYCE AND THE NATIONAL
NEWARK AND ESSEX BANKING CO. OF
NEWARK, EXECUTORS.
ARTHUR H. DICKINSON
BY Robert S. Dunham
ATTORNEY

Patented July 15, 1952

2,603,416

UNITED STATES PATENT OFFICE 2,603,416

SUMMARY CARD PUNCH AND COLLATOR

James W. Bryce, deceased, late of Glen Ridge, N. J., by Elizabeth Snow Bryce, Glen Ridge, N. J., and The National Newark and Essex Banking Company of Newark, Newark, N. J., executors, and Arthur H. Dickinson, Greenwich, Conn., assignors to International Business Machines Corporation, New York, N. Y., a corporation of New York Application August 13, 1949, Serial No. 110,196

18 Claims. (Cl. 235—61.7)

This invention relates to automatic electric accounting machines, and more particularly to perforated record card controlled machines adapted to the production of summary records and the collation of such summary records with the detail records from which the summaries are derived.

In its more specific aspect the invention relates to a machine designed to accumulate totals from perforated record cards, reproduce major and minor totals on one or more total cards, check such total cards against the source totals, and thereafter optionally or both, collate the total cards so reproduced and checked with the perforated record cards from which the detail data was derived, or direct the total cards into a separate receiving hopper.

In general, the machine consists of a punched card reading and analyzing station, a total card punching and checking station, and means interrelating the two stations for feeding the cards so that total cards may be collated with detail cards. An alternative control provides for the punching and checking of multiple total cards with collating feed of one set of total cards with the detail cards and the delivery of another set of total cards into a total card hopper.

Accordingly there is provided a detail card feeding and sensing unit which includes a hopper in which perforated detail record cards are placed and from which such cards are fed one at a time through a pair of card sensing assemblies, each consisting of card sensing brushes and a contact roll. A common clutch controls the operation of the detail card feeding and sensing mechanism. One of the two card sensing assemblies at the detail card feeding station controls the operation of accumulators into which detail data from the perforated cards passing through the sensing assembly is accumulated, and the two sensing assemblies together provide for auto control in the reproduction of major and minor totals in the total cards.

There is also provided a card feeding and reproducing station which includes a hopper in which either blank or partially punched cards, preferably differing in color from the detail cards, are disposed and from which they are fed periodically into a total reproducing device which is herein illustrated as a card punching mechanism. The total card feeding device also includes a card sensing assembly through which punched total cards pass and in which they are checked for accuracy by comparing the totals punched therein with the totals recorded in the accumulators. Provision is made in the control system for reproducing, as by punching, either a single total card showing either a major or minor total and for the checking of such card, or for the reproducing of a plurality of major or minor total cards and the checking thereof. The card feeding mechanism, the reproducing mechanism and the checking mechanism of the total card feeding unit is under clutch control so that total cards may be fed therethrough while cards from the detail card feed are passing through the detail card sensing unit, whereby the total cards are collated with the detail cards without substantial loss of operating speed.

From the detail card feeding and sensing unit the detail cards are fed through continuously operating feed rollers into a detail card receiving hopper. From the total card punching and checking unit, the total cards are fed along a delivery path between continuously running feed rollers, so that such cards may be fed into receiving hoppers. Along the path of the total card feed are a plurality of delivery hopper selecting blades by means of which the total cards may be either collated with the detail cards, or if two total cards are reproduced at each reproducing operation, one total card may be collated with the detail cards in the detail card receiving hopper, and a second total card may be delivered to a total card hopper. A reject hopper is provided for receiving cards on which the totals may have been inaccurately reproduced, the delivery of such erroneous total cards into the reject hopper being under control of the card hopper selection blades in the delivery path of total cards.

It is accordingly the principal object of the invention to provide a machine capable of sensing and accumulating totals from perforated record cards and for reproducing total cards showing either major or minor totals, and for thereafter collating the total cards with the detail cards.

It is a further object of the invention to provide in such machine means for checking total cards against information accumulating devices, and for discharging inaccurately reproduced total cards to a reject hopper.

It is a further object of the invention to provide a machine in which a plurality of total cards, showing either major or minor totals, may be reproduced and one in which one set of total cards may be collated with detail cards from which the information has been derived and wherein a second set of total cards may be delivered to a separate total card hopper.

It is a further object of the invention to provide for the checking of total cards by subtracting the amounts punched in total cards from accumulators in such manner as to reset the accumulators as a result of the checking operation.

It is furthermore an object of the invention to provide an alternative control wherein a plurality of total cards may be checked by comparing the totals therein against amounts set up in accumulators without disturbing such accumulator totals.

Further objects, advantages and uses of the machine will appear as the detailed description proceeds and is read in light of the drawings forming a part of the application in which drawings:

Figs. 1 and 1A constitute a sectional view through the machine showing the relative position of the various units;

Figs. 7A–7E are the circuit diagram for the punching and checking of single total cards;

Figs. 7C-1 and 7D-1 show the necessary modification in the control circuit for the punching and checking of multiple total cards.

The machine consists of primarily two units, a punched card reading and analyzing unit and a total card punching and checking unit so arranged that punched total cards may be disposed with detail cards or may be directed to a separate card receiving hopper.

Figure 7B:
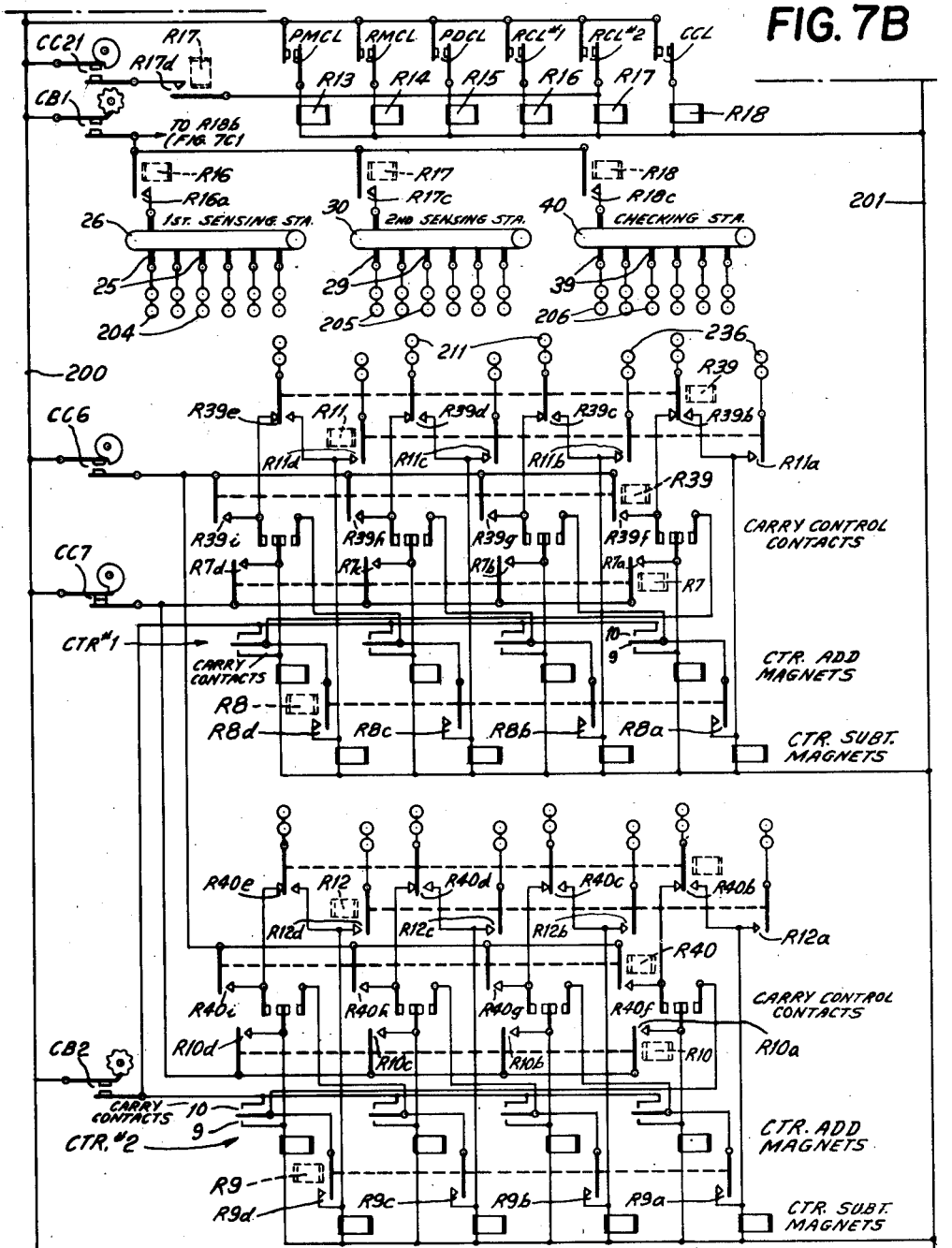
Figure 7C:
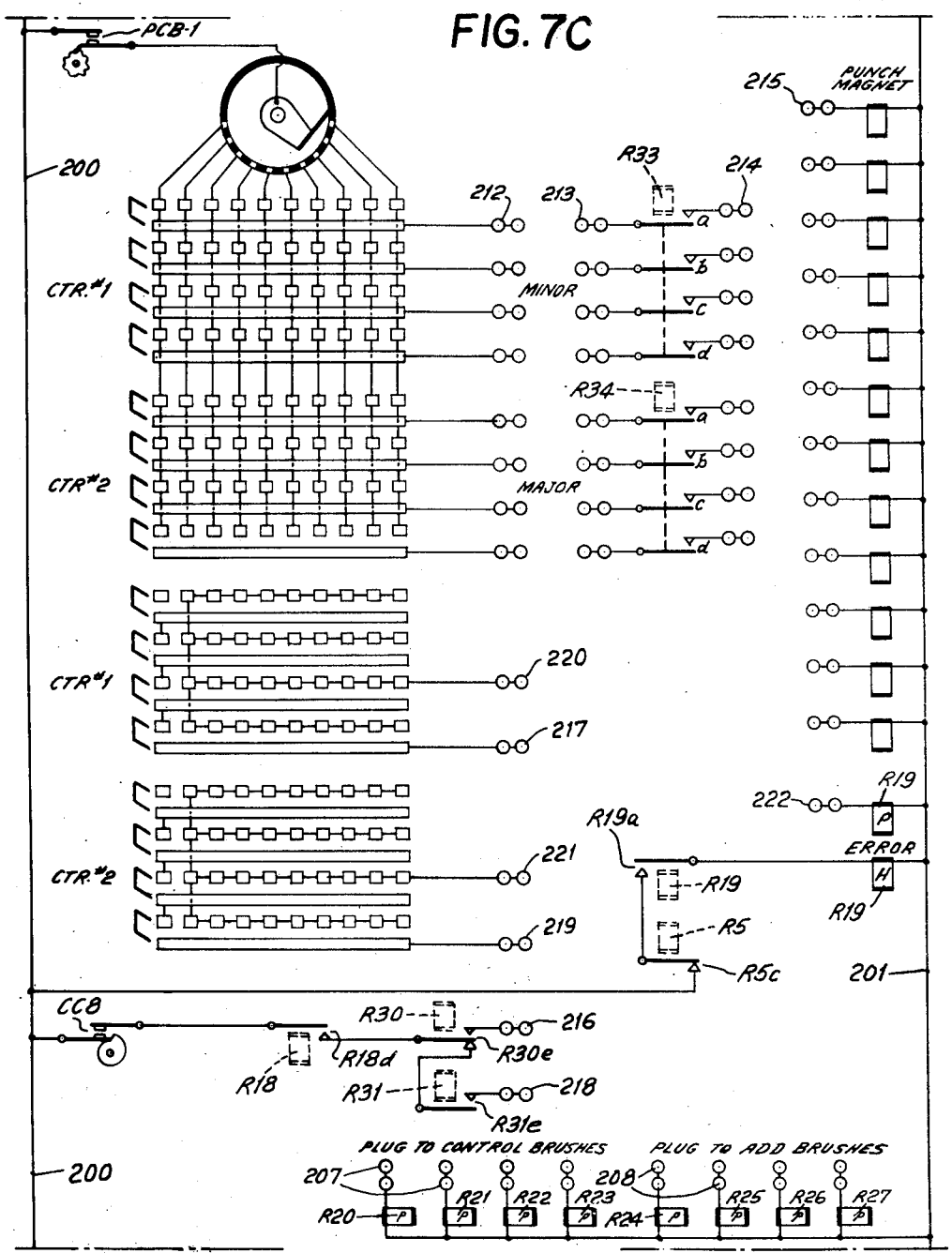
Figures 1, 7D:
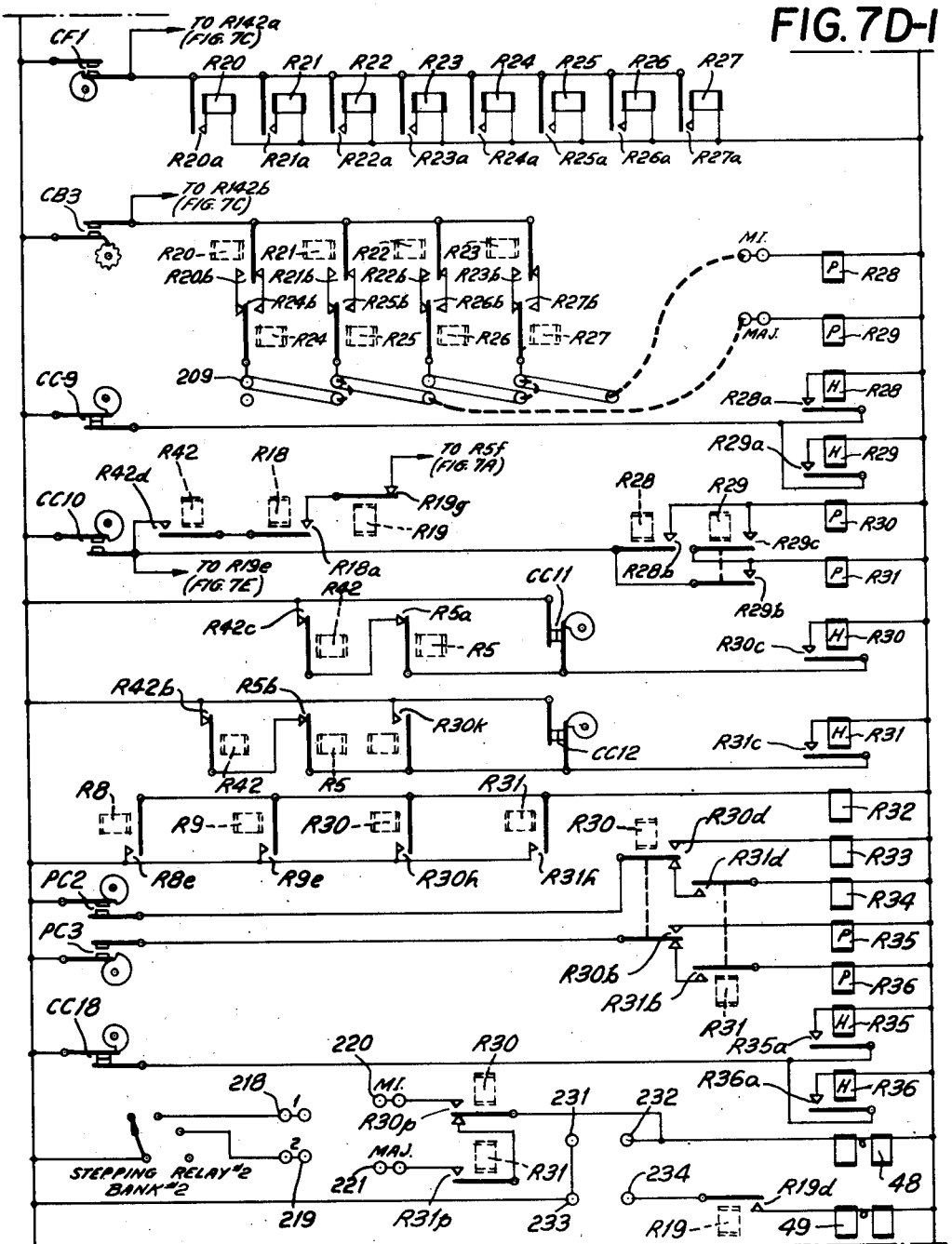

Referring to Fig. 1, the card reading and analyzing unit consists of a supply hopper 21 from which perforated record cards 22 are fed one at a time by a card feed knife 23 to and into a first set of feed rolls 24. Thence the cards are fed between a set of sensing brushes 25 and a contact roll 26 to an advance sensing station to and into second and third sets of feed rolls 27 and 28. The cards are then fed between a second set of sensing brushes 29 and an associated contact roll 30 of the second sensing station. From this point the cards are fed to and into clutch controlled feed rollers 28a and then into the first pair of a plurality of feed rolls 31. The feed rolls 31 carry the cards onto further feed rolls which deliver the cards to a card receiving hopper 32. The card feed knife 23, the feed rolls 24, 27, 28, 28a and the contact rolls 26, 30 are all under common clutch control and the feed rolls 31 are continually running.

The card punching and checking unit consists of a card supply hopper 33 from which cards 34, preferably differing in color from the perforated detail cards 22, are fed by a card feed knife 35 to and into a set of feed rolls 36. The cards are then fed by means of the feed rolls 36 through a die and stripper of a card punch to a succeeding set of feed rolls 37. The feed rolls 37 feed the cards to a further set of feed rolls 38, and the feed rolls 38 advance the cards between a set of sensing brushes 39 and an associated contact roll 40 of a checking station. A plurality of feed rolls 41 carry the cards to a selected one of three card receiving hoppers 32, 42 or 43. The card feed knife 35, and the feed rolls 36, 37 are all under common clutch control and the feed rolls 38 and 41 and the contact roll 40 are continually running.

Figure 3:
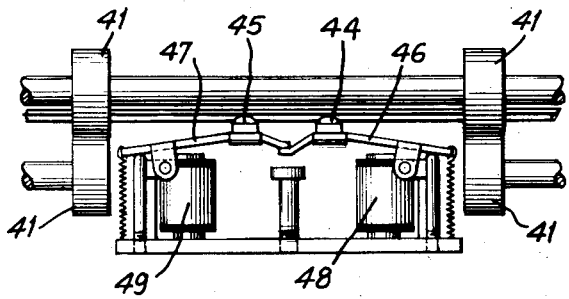
Fig. 3 is a section taken along line 3—3 of Fig. 1A and shows the pocket selector magnets and the tips of the card guide blades.

Located between the second and third set of feed rolls 41 from the right of the contact roll 40, as viewed in Figs. 1 and 1A, is a pocket selection mechanism which consists of two pocket selection chute blades 44 and 45, see also Fig. 3, the leading edge of each resting on a guide surface of armatures 46 and 47 respectively which, in turn, are operated by their respective magnets 48 and 49. The armatures are so arranged that the energization of the magnet 48 will attract its associated armature 46 and lower the leading edge of the chute blade 44. The energization of the magnet 49 will attract its armature 47 and lower the leading edge of the chute blade 45 and at the same time the armature 47, because of its overlapping contact with the armature 46, will push the armature 46 down and lower the leading edge of the chute blade 44.

The chute blade 44 is secured at its opposite edge to a triangular bracket 50 (Fig. 1A) which is secured to a partition 51 between the receiving hoppers 32 and 42. The chute blade 45 has its opposite edge secured to a triangular bracket 52 mounted on a partition 53 between the receiving hoppers 42 and 43. Thus, if neither of the magnets 48 and 49 are energized, the cards will be guided under both chute blades 44 and 45 and they will be fed to the receiving hopper 32. If the pocket selection magnet 48 is energized, the chute blade 44 will be lowered and the cards will be guided between the chute blades 44 and 45 and into the receiving hopper 42. If the magnet 49 is energized, both the chute blades 44 and 45 will be lowered and the cards will be guided over the chute blades 44 and 45 and into the receiving hopper 43.

Figure 2:
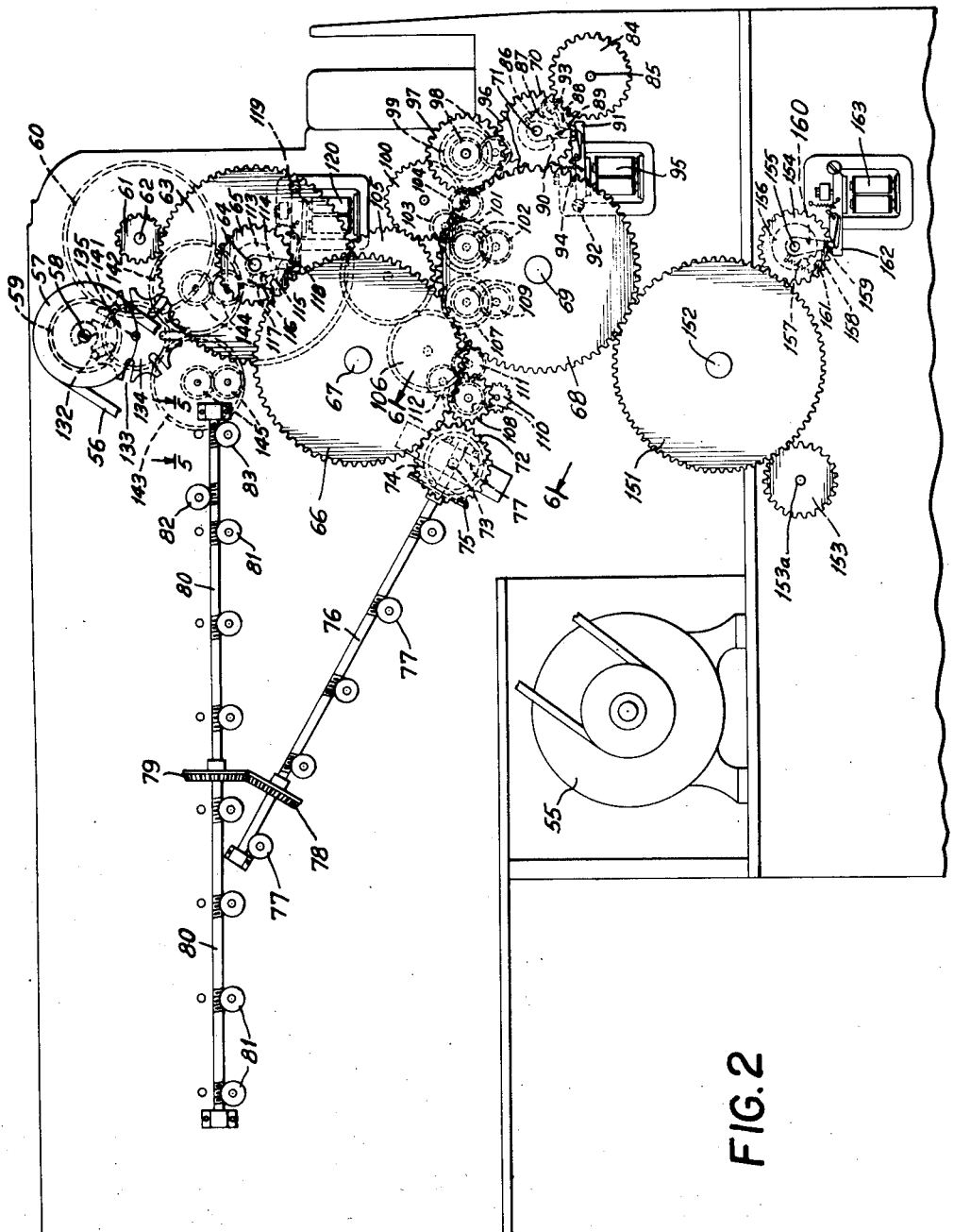
Fig. 2 is a side elevation showing the drive for the various units.
Figure 4:
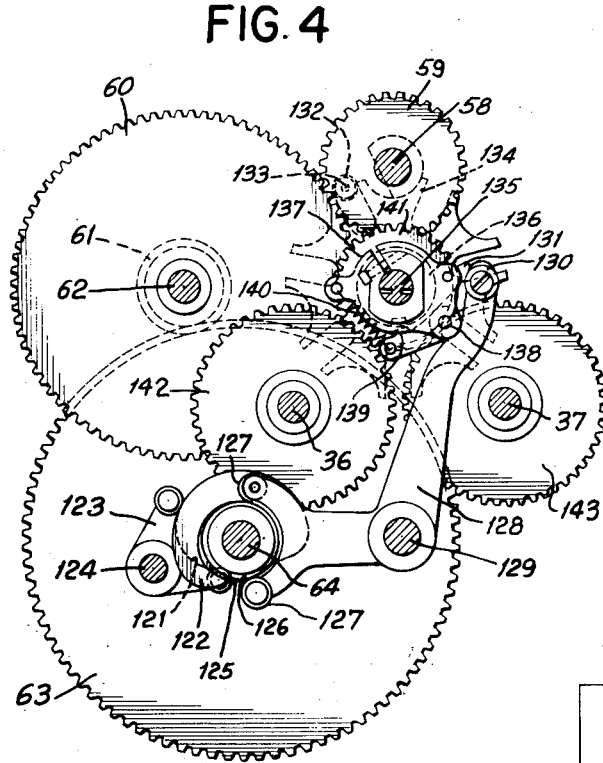
Fig. 4 is a view showing the intermittent drive for the punch card feed and punch mechanism.
Figure 5:
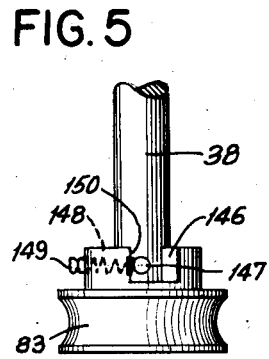
Fig. 5 is a view taken substantially along line 5—5 of Fig. 2 and shows the yieldable drive for the feed roll 38.
Figure 6:
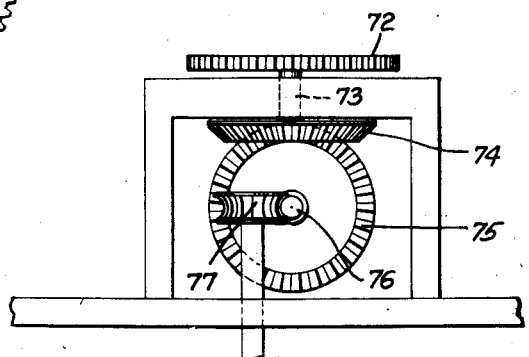
Fig. 6 is a view taken substantially along line 6—6 (Fig. 2) and shows the drive to the continually running feed rolls.

The drive for the various units is best shown in Figs. 2 and 4. A motor 55 drives a pulley 57 by means of a connecting belt 56. The pulley 57 is secured to a shaft 58 to which is also secured a gear 59. The gear 59 meshes with a gear 60 which has secured to it a gear 61 and is rotatably mounted on a stud shaft 62. The gear 61 meshes with a gear 63 rotatably mounted on a shaft 64. Secured to the gear 63 is a gear 65 which is in mesh with a gear 66, the latter being rotatably mounted on a stud shaft 67. Gear 66 in turn meshes with a gear 68 which is rotatably mounted on a stud shaft 69. The gear 68 meshes with a gear 70 which is rotatably mounted on a shaft 71. Gear 66 also meshes with a gear 72 which is secured to a shaft 73 to which is also secured a miter gear 74. The miter gear 74 meshes with a miter gear 75 secured to a shaft 76. The shaft 76 through worm threads cut therein drives worm wheels 77 which in turn are secured to the feed rolls 31. Secured to shaft 76 is a second miter gear 78 which meshes with a miter gear 79 secured to a shaft 80. The shaft 80 through worm threads cut therein drives worm wheels 81, 82 and 83. The worm wheels 81 drive the feed rolls 41, the worm wheel 82 drives the contact roll 40 and the worm wheel 83 through a flexible coupling drives the feed rolls 38.

Attached to the gear 70 is a clutch disc 86 having therein a notch 87. Cooperating with the notch 87 is a pawl 88 mounted by means of a pivot 89 on an arm 90 which is attached to the shaft 71. One end of the pawl 88 is engaged by an armature latch 91 pivoted at 92 and the other end of the pawl has formed therein an extension 93 adapted to fall into the notch 87. A spring 94 normally holds the armature latch 91 into engagement with the pawl 88. When an associated magnet 95 is energized, the latch is moved away from the pawl, and the extension 93 engages in the notch 87 thus connecting the gear 70 with the shaft 71.

The feed knives 23 are driven by an eccentric mounted on the shaft 71 in the same manner as decribed in Clair D. Lake, U. S. Patent No. 2,032,805.

There is also secured to the shaft 71 a gear 96 meshed with a gear 97 which is secured to the upper roll of the pair of feed rolls 24. A pair of gears 98 are secured to the feed rolls 24 and effect positive drive of both feed rolls. A third gear 99 intermediate the gears 97 and 98 is secured to the top feed roll 24 and meshes with an idler gear 100. Meshed with the idler gear 100 is a gear 101 secured to the top feed roller of the pair of feed rolls 27. The top and bottom feed rolls 27 are positively driven by means of gears 102 secured to the feed rolls 27. The contact roll 26 has a gear 104 secured to it and is driven by means of an idler gear 103 meshing with the upper gear 102 and a gear 104.

Gear 100 also meshes with a gear 105 which in turn is meshed with a gear 106. The gear 106 in turn meshes with two gears 107 and 108 which are secured to the top feed roll of the pairs of feed rolls 28 and 28a, respectively. The lower feed rolls of each pair are positively driven by means of gears 109 and 110 of each pair of feed rolls. The contact roll 30 has a gear 111 secured to it and is driven by means of an idler gear 112 meshing with the upper gear 110 and the gear 111.

It can now be understood how the feeding of cards from the supply hopper 21 is under clutch control to and through the second card reading station, and after the cards have passed through the second reading station the feeding of the cards is no longer under clutch control but they will continue without interruption to the card receiving hopper 32.

Meshed with the gear 96 is a gear 84 attached to shaft 85. Mounted on shaft 85 are the various contact operating cams F. C.

The drive for the first two sets of feed rolls 36 and 37 and the punch operating bail are similar to that described in U. S. Patent No. 2,032,805 issued to C. D. Lake, and therefore will be described only briefly here. Attached to the gear 63 is a notched disc 113. Secured to shaft 64 is an arm 114 to which is pivoted a pawl 115 having an extension 116 located near its outer end. A spring 117 tends to engage the extension 116 with the notch of disc 113 but is restrained from so doing by a latch arm 118. The latch arm 118 is pivoted at 119 and is actuated by the energization of magnet coils 120. Upon energization of the magnet coils 120 the extension 116 of pawl 115 will engage the notch of disc 113 and thus couple the shaft 64 with the gear 63.

Reciprocating motion is imparted to the feed knives 35 by means of a complemented pair of cams 121 and 122 (Fig. 4) secured to the shaft 64. The cams coact with cam follower 123 secured to a shaft 124.

Also secured to the shaft 64 is a second pair of complemented cams 125 and 126. A pair of cam followers 127 mounted on one end of a bell crank 128 pivoted at 129 coacts with the cams 125 and 126 and causes the bell crank 128 to be rotated clockwise a short distance from the position shown in Fig. 4 and then counterclockwise to the position shown. At the opposite end of the bell crank 128 is a roller 130 which coacts with one end of a pawl 131.

Secured to the gear 59 is a roller 132 which engages the slotted section 133 of a Geneva cross 134. The Geneva cross 134 is rotatably mounted on a shaft 135 and has secured to it a notched disc 136. Clamped to the shaft 135 is a member 137 to which is pivoted the pawl 131. The pawl 131 has an extension 139 which is biased by a spring 140 to engage with the notch in the disc 136 but is held therefrom by the roller 130 when the bell crank 128 is in the position shown. When the bell crank 128 is moved clockwise, as previously explained, the extension 139 engages the notch in the disc 136 and thus couples the Geneva cross with the shaft 135. Secured to the shaft 135 is a gear 141 which is meshed with a gear 142 and 143, these gears being secured to the upper rolls of the feed rolls 36 and 37 respectively. Also secured to the feed rolls 36 and 37 are gears 144 and 145 which serve to positively drive the pairs of feed rolls. It has now been described how the first two pairs of feed rolls and the card feed knife, in the punch unit, are under clutch control and the remainder of the mechanism is continually running.

As previously described the feed rolls 38 are continuously driven by the gear 83. The gear 83 is yieldably coupled to the feed roll 38 in order to permit the card, which is being intermittently fed past the punch stations, to be fed into the continuously running feed rolls. The hub of the gear 83 has a cut-out portion 146 in which a pin 147 secured to the shaft 38 is located. A spring 148 is coupled between the pin 147 and a pin 149 secured to the hub of the gear 83, and the spring holds the pin 147 in engagement with the surface 150 of the cut-out section 146.

The punch cam shaft and the continuously running cam shaft, which also serves to drive the counter plates, is driven as follows. A gear 151 rotatably mounted on a stud 152 meshes with the gear 68. Also meshed with the gear 151 is a gear 153 secured to a shaft 153a on which are mounted the several (continuously running) cams C. C. and the accumulator plate drive gears. A gear 154 which is rotatably mounted on a shaft 155 is also meshed with the gear 151. Secured to the gear 154 is a disc 156 in which is formed a notch 157. Cooperating with the notch 157 is a pawl 158 mounted at 159 on an arm 160 attached to the shaft 155. An extension 161 on the pawl 158 is held from engaging the notch 157 by a magnet arm 162. Energization of a magnet 163 will cause the arm 162 to release the pawl 158 and permit it to engage the notch 157 of the disc 156 and thus rotate the shaft 155.

The punching mechanism is of conventional structure and it includes a rock shaft 175 (Fig. 1) to which is fixed a pair of arms 176 intermediate the side frames. Between the arms 176 and a punch operating bail 177 there is provided an adjustable turnbuckle connection. A threaded rod 178 is pivoted at 179 on the arm 176, and another rod 180 is pivoted at 181 on the bail 177, both rods being connected by a double ended bolt 182 which is adjustable to vary the position of the bail.

The bail 177 is pivoted on studs 183 in the main side frames and carries a punch actuating bar 184 which is adapted to cooperate with notches 185 in any of a plurality of selected interposer pawls 186. Each of the punch plungers 186' has an interposer pawl 186 which is pivotally connected thereto by a pin 187. Normally the pawl is held out of the path of the bar 184 and the plunger is held above the die by a spring 188 attached to the pawl. However, when a punch magnet PM is energized, the associated pawl is drawn into cooperation with the bar 184 and the related plunger is depressed to perforate the card.

An armature 189 of the punch controlling magnet PM is mounted on a lever 190 by means of a pivot 191. The lower end of lever 190 is pivotally connected to a call wire 192, the other end of which is pivoted at 193 on the pawl 186. A plurality of such connections are made, one to each pawl, the punch magnets PM being arranged in staggered rows and columns. Magnet brackets 201 carry the magnets of one row as a unit, and have arms 202 which hold an insulation bar 203 suspended above the magnets to act as a terminal bar. A number of such units may be dropped into the frame and conected by call wires 192.

When attracted, the armature 189 swings the lever 190 in a counterclockwise direction, and draws the wire 192 to the right, urging the pawl 186 into cooperation with the bar 184. The pawls 186 are aligned by slots in a plate 195 fastened on a supporting bar 196, the plate being used also to secure one end of the springs 188. The edge of the bar 196 cooperates with a cam face on the pawls 186 to hold the selected pawls into cooperation with the bar 184 as the bar is lowered.

An extension 197 on a fixed bar 198 cooperates with the upper ends of the pawls to cam them in a counterclockwise direction out of engagement with the ascending bar 184 on the return stroke of the ball. In order to positively hold the pawls in disengaged position, the end of bar 184 cooperates with a cam face on each pawl. There is a limit to the downward motion of the plungers 186' because of the presence of a fixed bar 199 which projects into notches 200 cut in the side of the plungers 186'. The plungers are guided above the holes in the die 167 by sliding in the stripper plate 166.

The operation of punching is timed to occur during the pause in card feeding when the Geneva wheel 134 is not in action. As the bail and bar 184 are reciprocated, any of the pawls may be moved over by the call wires until notches 185 engage the end of bar 184. Then the connected pawls and plungers are depressed to perforate the card and quickly withdraw therefrom to permit the feeding of the card to continue to the next index position.

The accumulators used herein are disclosed in U. S. Patent No. 2,328,653 to C. D. Lake and W. Pfaff.

*Circuit description*

Upon closure of the main line switch S, power will be applied to the lines 200 and 201 and the drive motor 55 will operate.

Assuming now that the supply hoppers 21 and 33 have cards in them, the hopper 21 having detail cards in it and the hopper 33 having blank cards or partially punched cards in it, the punch magazine card lever P. M. C. L. (Fig. 7B) and the read magazine card lever R. M. C. L. contacts will be closed and their associated relays R-13 and R-14 will be energized.

*Punch card feed control*

Upon depressing the start key and closing the start key contact (Fig. 7A) a circuit is completed through the R-1 relay closing its R-1a, R-1b, R-1c, R-1d, R-1e points. Closure of the contact R-1a completes a hold circuit for the R-1 relay as follows: from the line 200, through the contacts R-15a and R-17a, which are in parallel, through the R-1a contact, now closed, through the R-1 relay coil to the line 201. The first time cam contact CC-1 closes following the energization of the R-1 relay, the relay R-2 will be energized through the following circuit: from the line 200, through the normally closed stop key contact, through the now closed R-13a and R-14a contacts (or R-1c contact), through the normally closed R-19a contact, cam contact CC-1, the R-1b contact, the coil of the relay R-2 and to the line 201. Energization of the relay R-2 causes its contacts R-2a, R-2b and R-2c to close. Closure of the contact R-2a completes a hold circuit for the R-2 relay as follows: from the line 200, through the normally closed stop key contact, through the contacts R-13a, R-14a, or R-1c, now closed, the contact R-19a, contact R-2a now closed, through the coil of the relay R-2, and to the line 201.

The first time cam contact CC-2 closes after the energization of the relay R-2 a circuit will be completed through the punch unit clutch coils 120 and 163 as follows: Line 200, through the now closed cam contact CC-2, the contact R-2b now closed, the contact R-1d now closed, through the normally closed points of the contacts R-15b, through the clutch magnet coils 120 and 163, and to the line 201.

Energization of the clutch magnet 120 initiates card feeding in the punch unit and the energization of clutch magnet 163 causes the punch cam shaft to be rotated, thereby operating the punch cams.

A card is now fed from the bottom of the stack 34 in the hopper 33 (Fig. 1) and by contact with the punch die card lever causes the associated contact to close and energize the relay R-15 as follows: Line 200, through the now closed P. D. C. L. contact (Fig. 7B), the coil of the relay R-15, and to the line 201. Energization of the relay R-15 opens its R-15a contact and transfers its R-15b contact. The transferring of the R-15b contact (Fig. 7A) opens the circuit to the punch clutch magnets 120 and 163, thus permitting the punch clutches to latch up at the end of the cycle.

The circuit just described has caused a card to be fed from the supply hopper 33 to the punch station ready to have information punched in it the next time the punch clutch magnets 120 and 163 are energized.

When a circuit is completed through the punch clutch coils 120 and 163, by the closure of CC-2, a circuit is also completed through the read unit clutch coil 95 and the relay R-3 as follows: Line 200, cam contact CC-2, R-2b, R-1e, through the normally closed points of R-17b, through the normally closed contacts R-32a, through the clutch coil 95 and the relay coil R-3 and to the line 201. Energization of the relay R-3 causes closure of its R-3a contact which completes a holding circuit for the clutch magnet coil and the relay R-3 as follows: Line 200, through the R-2c contact, now closed, through the normally closed R-32b contact, through the now closed R-3a contact through the R-3 relay coil and the clutch magnet coil 95, and to the line 201.

The circuit just described causes a perforated record card to be fed from the bottom of stack 22 in the detail card hopper 21, to the first sensing station, i. e. to contact roll 26 and the associated sensing brushes 25. Near the end of this cycle the relay R-16 is energized by the closure of RCL #1 card lever contact.

During the next cycle the first card is fed from the contact roll 26 and the brushes 25 to the second sensing station in which is located the sensing brushes 29 and the associated contact roll 30. As the card is fed past the first sensing station, a major and minor control break is effected (circuits to be described later) and the relay R-32 is energized, thereby causing the contacts R-32a and R-32b to open and R-32c to close. Opening of R-32b opens the holding circuit for the relay R-3 and the clutch magnet coil 95. Opening of R-32a prevents a circuit being completed through the R-3 relay coil and the clutch magnet coil 95 upon closure of the CC-2 contact at the end of the cycle. Just prior to the completion of the detail card feed at the end of the second card feed cycle the RCL #2 contact is closed and completes a circuit through the R-17 relay coil, energizing the R-17 relay and thus causing the R-17a contact to open, the R-17b contact to transfer and the R-17c (R-17d) contacts to close. Upon opening of contact R-17a the holding circuit for the relay R-1 is opened and, providing the start key is not held closed, the relay R-1 will be deenergized.

Thus upon initial depression of the start key, two card feeding cycles occur, in the first of which a card is fed to the punching station whereupon the feed is suspended until called into operation for recording a result. At the same time the second feeding cycle feeds cards into the reading unit of the machine such that the first card is at the second sensing station and the second card is at the first sensing station.

The break in control which occurred during the second card feed cycle just explained caused the contact R-32c to close, and near the end of the cycle when the cam contact CC-2 closes a circuit will again be completed through the punch clutch magnets 120 and 163 as follows: From the line 200, through the cam contact CC-2, through the contact R-2b (now closed), through the contact R-32c (now closed), through the contact R-30a (now transferred), (relays R-30 and R-31 are energized by virtue of the major and minor control break and the circuits for energizing them will be described later), through the normally closed R-35a contact, through the R-15b contacts (now transferred), through the punch clutch magnet coils 120 and 163, and to the line 201. A punching operation follows and a new card is fed to the punching station. During the punch cycle the relay R-35 is energized upon closure of PC-3 (Fig. 7D) as follows: Line 200, through PC-3, normally open points of contact R-30b, pick-up coil of R-35 and to the line 201. A circuit is completed through the holding coil of the relay R-35 as follows: Line 200, CF-2 cam contact, R-35b contact (now closed), holding coil of the relay R-35, and to the line 201. Energization of the relay R-35 also opened its R-35a points, thus opening the circuit to the punch clutch magnets 120 and 163, thus causing the punch unit to latch up at the end of the cycle. The card just punched, however, continues to be fed and is fed past the checking station between the contact roll 40 and the brushes 39. The amounts punched in the card are checked against the amounts standing in the counters from which the card was punched. The checking operation, except when two cards are punched and checked as will be described later, may be accomplished by subtracting from the counter the amount punched in the card and if the amount punched in the card is correct the accumulator will be returned to zero. If the accumulator is not returned to zero, the machine will stop and a suitable indication will be given. The circuits for this operation will be described in detail later. If the punched card is found to be correct the relay R-30 will be deenergized before the end of the checking cycle and when the cam contact CC-2 closes near the end of the checking cycle the punch clutch magnets 120 and 163 will again be energized via the following circuit: Line 200 (Fig. 7A) cam contact CC-2, R-2b, R-32c, R-30a (normally closed points), R-31a, now closed, R-36a and R-15b (now transferred) through the clutch coils 120 and 163 and to the line 201. During this punching cycle when the PC-3 contact closes (Fig. 7D) a circuit will be completed through the pick-up coil of the relay R-36 as follows: Line 200, PC-3, R-30b (normally closed points), R-31b (now closed), through the pick-up coil of relay R-36, and to the line 201. A circuit is established through the holding coil of relay R-36 by the closure of its R-36b contact back through the CF-2 cam contact. Energization of the R-36 relay opened the R-36a contact, thus preventing further energization of the punch clutch magnets 120 and 163 until a detail card feeding operation has occurred and a control break is effected.

The major total card, just punched, continues to be fed and is fed past the checking station where the information punched in the card is checked against the information in the accumulator from which the card was punched. During the checking cycle, if the card is found to be punched correctly, the relay R-31 is deenergized. Upon deenergization of both relays R-30 and R-31 the relay R-32 will be deenergized causing the R-32 relay contacts to return to normal. Near the end of this checking cycle upon closure of CC-2 (Fig. 7A) the detail card feed clutch magnet and relay R-3 will be energized as follows: Line 200, cam contact CC-2, R-2b and R-17b (now transferred), R-32a, the clutch magnet coil 95 and the relay coil R-3, and to the line 201. Energization of relay R-3 closes the R-3a contact and establishes a holding circuit as follows: From the line 200, R-2c, R-32b and R-3a, through clutch magnet coil 95 and the coil of relay R-3, and to the line 201, thus maintaining the detail card feed unit in operation until another control break occurs.

*Auto control*

Provision is made for two classes of auto control, i. e. major and minor auto control, assuming that there are two columns of major control and two columns of minor control the plugging required is as follows: From the two major control field plug hubs 204 (Fig. 7B) to the two left hand plug hubs 207 (Fig. 7C) and from the two minor control field plug hubs 204 to the two right hand plug hubs 207. From the two major control field plug hubs 205 (Fig. 7B) to the two left hand plug hubs 208 and from the two minor control field plug hubs 205 to the two right hand plug hubs 208. Plug connections are made between the plugs hubs 209 directly below contact R-25b (Fig. 7D) and R-27b, also between the extra right hand plug hub 209 and the minor plug hub 210 and between the lower plug hub 209 directly below the contact R-26b and the major plug hub 210. As the cards are being fed past the first and second sensing stations simultaneously, a hole in the card when presented between the contact roll and columnar brush will complete a circuit through certain of the auto control relays (R–21 through R–27). Referring to the units order of the minor control, as the hole in the units order of the control field in the card passing the first sensing station passes the sensing brushes, a circuit will be completed through the relay R–23 pick-up coil (Fig. 7C) as follows: From the line 200 (Fig. 7B), CB–1, R–16a, into the contact roll 26, through the hole in card, to the brush 25, through the plug hub 204, through the plug wire, into the plug hub 207, to the pick-up coil relay R–23 and into the line 201. Energization of the relay R–23 closes its R–23a points and transfers its R–23b points. Closing of the R–23a points (Fig. 7D) establishes a holding circuit for the R–23 relay as follows: Line 200, CF–1, R–23a, hold coil of relay R–23 to line 201. At the same time, if the hole in the units order of the control field in the card passing the first sensing station is in agreement with the corresponding hole of the card passing the second sensing station, a circuit will be completed through the pick-up coil of the relay R–27 (Fig. 7C) as follows: Line 200 (Fig. 7B), CB–1, R–17c, into the contact roll 30, through the hole in the card, through the brush 29, into the plug hub 205, the plug wire, into the plug hub 208 (Fig. 7C), through the pick-up coil of the relay R–27 and to the line 201. Energization of the relay R–27 causes its R–27a contacts to close and its R–27b contacts to transfer. Closure of the R–27a contacts completes a holding circuit through the holding coil of the relay R–27 similar to the holding circuit for the relay R–23.

After CB–1 opens, at each index point, CB–3 closes and applies a test pulse to each of the pairs of contacts R–20b, R–24b, R–21b, R–25b, R–22b, R–26b, R–23b and R–27b. If the data in each card is in agreement the circuits through these contacts will be maintained open. If however, the data should not be in agreement in any one or more of the columns the related pairs of contacts R–20b, R–24b, etc. will establish a circuit which will be completed upon closure of CB–3. Referring again to the units column of the minor control field and assuming that the data punched in that column is not in agreement, for example, the column being sensed at the second sensing station having a "9" hole punched in it and the colmun being sensed at the first sensing station having a "7" hole punched in it. When the "9" hole is sensed at the second sensing station, the relay R–27 will be energized and the R–27b contacts will be transferred. At 9.5 when the CB–3 contact closes, a circuit will be completed through the pick-up of relay R–28 as follows: Line 200, CB–3, R–23b (normally closed points), R–27b (now transferred), plug hub 209, plug wire, minor plug hub 210, pick-up coil R–28 relay, to line 201. Energization of the relay R–28 causes its associated contacts R–28a, R–28b to close. Closure of R–28a completes a circuit through the R–28 relay holding coil as follows: Line 200, cam contact CC–9, R–28a, R–28 holding coil, and to the line 201. Closure of contact R–28b establishes a circuit which will be completed upon closure of the cam contact CC–10 as follows: Line 200, cam contact CC–10, R–28b, R–30 pick-up coil, and to the line 201. Energization of the relay R–30 transfers its contacts R–30a and R–30b previously described. It also closes its contact R–30c, transfers its contacts R–30d, R–30e, R–30f, and R–30g, and it closes its contacts R–30h, R–30k. Closure of R–30c contact completes a circuit through the R–30 holding coil as follows: Line 200, R–18a, R–5a, R–30c, R–30 holding coil, and to the line 201. The relay R–30 will remain energized until the latter part of the checking cycle, if the data punched in the card is found to be correct. If, however, the data punched in the card is found to be in error the relay R–30 will remain energized until the operator manually depresses the error reset key which resets the accumulators from which the card, found to be in error, had been punched.

If the control change occurs in the major control data field, a circuit will be completed through the R–29 relay pick-up coil upon closure of CB–3 through the R–21b and R–25b contacts or the R–20b and R–24b contacts, or both. The relay R–29 establishes a holding circuit through its holding coil through closure of the R–29a contacts. Energization of the relay R–29 also causes energization of the relays R–31 and R–30 through closure of the R–29b, R–29c contacts when cam contact CC–10 closes.

When a major control break occurs two total card punch cycles and related checking cycles ensue. The first punch cycle records the minor total data and the second punch cycle records the major total data. During the checking cycle of the minor total data the relay R–30 will drop out if the punched data is found to be correct. If the punched data is found to be in error, the related relay R–30 or R–31 will remain energized until the operator depresses the error reset key. Energization of either of the relays will cause energization of the relay R–32 by the closure of either of the contacts R–30h or R–31h and relay R–32 will remain energized as long as either of the contacts are closed.

Accumulator entry

To effect entry into the accumulators, it is necessary to plug connect the accumulators to the second sensing station accordingly. To make an entry into accumulator #1 (Fig. 7B) it is necessary to plug connect from the accumulator plug hub 211 to the second sensing station plug hub 205. Assuming a "5" hole in the units column, the circuit effective for entering a "5" into units order of the accumulator is as follows: Line 200, CB–1 (at "5" time), R–17c (now closed), contact roll 30, brush 29, plug hub 205, plug wire, plug hub 211 (units order), R–39b (normally closed), carry control contacts "A" (now closed), accumulator add magnet (units order), and to the line 201. Energization of the accumulator add magnet causes the accumulator clutch to engage at "5" and rotate the accumulator wheel. At the "0" machine time the accumulator clutch is mechanically disengaged and the accumulator wheel will come to rest with a "5" entered into it.

Carry circuit

If an order has passed from "9" to "0" in the Lake et al. Patent No. 2,328,653 it is necessary to effect a carry (add "1") to the next higher order. If this condition has occurred in an order, its carry contacts "10" are closed. At the carry time in the machine cycle the carry control contacts "B" are closed and "A" are open. When CB–2 closes at the carry time a circuit is completed through the add magnet of the next higher order (assuming units order accumulator #1 went through "9" to "0"), as follows: Line 200, CB–2, accumulator carry contact "10," carry control contact "B" tens order, add magnet (tens order) to line 201, thus effecting an entry of "1" into the tens order.

If an order has passed through "9" and the next higher order stops at "9" then a carry must be effected into the two orders above the order that went through "9." For an example, assume that the units order went through "9" as just explained and the tens order stopped at "9" then the units order accumulator carry contacts would be closed on the 10's side and the tens order accumulator carry contact would be closed on the 9's side. The carry pulse through the tens order will be as previously described. The carry pulse through the hundreds order will be the same as for the tens order up to the tens order add magnet where a circuit then branches off through the tens order accumulator carry contacts on the 9's side, through the hundreds order carry control contacts "B" through the hundreds order accumulator add magnet to line 201.

Total card punching

When a minor or major control break occurs one or two card punching cycles follow in accordance with a minor or major control change.

If it is a minor control break the relay R-30 will be energized and if it is a major control break the relays R-30 and R-31 will be energized.

Let us assume that the minor totals are accumulated in accumulator #1 and the major totals are accumulated in accumulator #2, then the following plug connections will be necessary: From plug hubs 212 of accumulator #1 to plug hub 213 (minor readout control), from plug hub 214 (minor readout control) to plug hub 215. Also from plug 212 accumulator #2 to plug hub 213 (major readout control), from plug hub 214 (major readout control) to plug hub 215.

Assuming that a major control break occurs, the relays R-30, R-31 and R-32 (Fig. 7D) will be energized as previously explained. A punch cycle is initiated and upon closure of PC-2 the relay R-33 will be energized in the following manner: Line 200, PC-2, R-30d (now transferred), R-33 coil, to line 201. Energization of relay R-33 closes its contacts R-33a, R-33b, R-33c, and R-33d (Fig. 7C). Closure of these contacts condition circuits to the punch magnets which will be completed upon closure of PCB-1. During the second punch cycle the relay R-34 (Fig. 7D) is energized as follows: Line 200, PC-2, R-30d (normally closed points), R-31d, R-34 relay coil, to line 201. Energization of relay R-34 closes its contacts R-34a, R-34b, R-34c, and R-34d (Fig. 7C). Closure of these contacts conditions circuits to the punch magnet which will be completed upon closure of PCB-1. A typical circuit would be as follows: Assuming that there is a "5" in units order of accumulator #1, then at the "5" to the punch magnets which will be completed follows: Line 200, PCB-1, readout emitter 5 segment, units order accumulator readout 5 segments, units order accumulator readout common, plug hub 212, plug wire, plug hub 213, R-33a, plug hub 214, plug wire, plug hub 215, to the punch magnet coil, and to the line 201.

Multiple total card punching

Figure 7E:
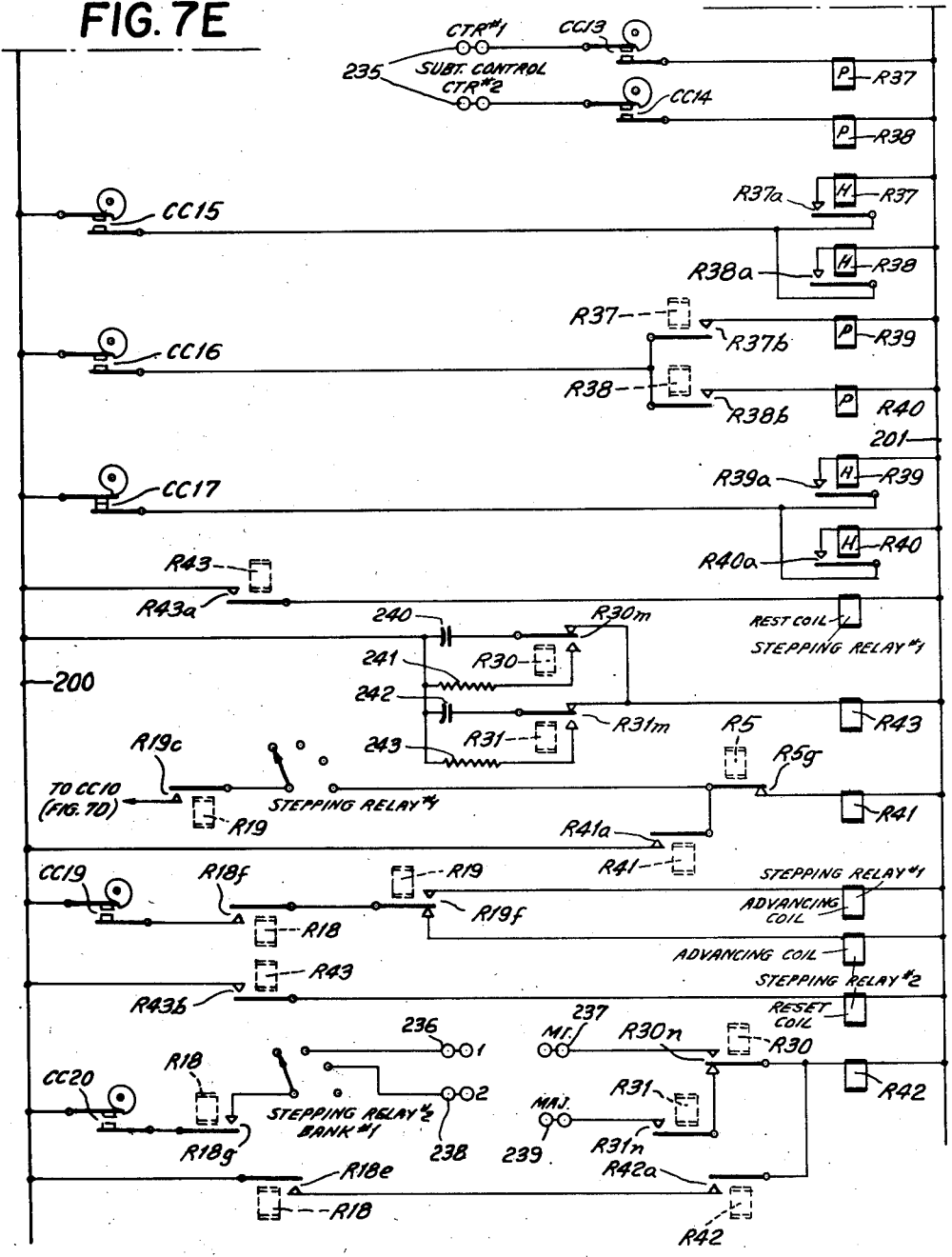
Figure 8:
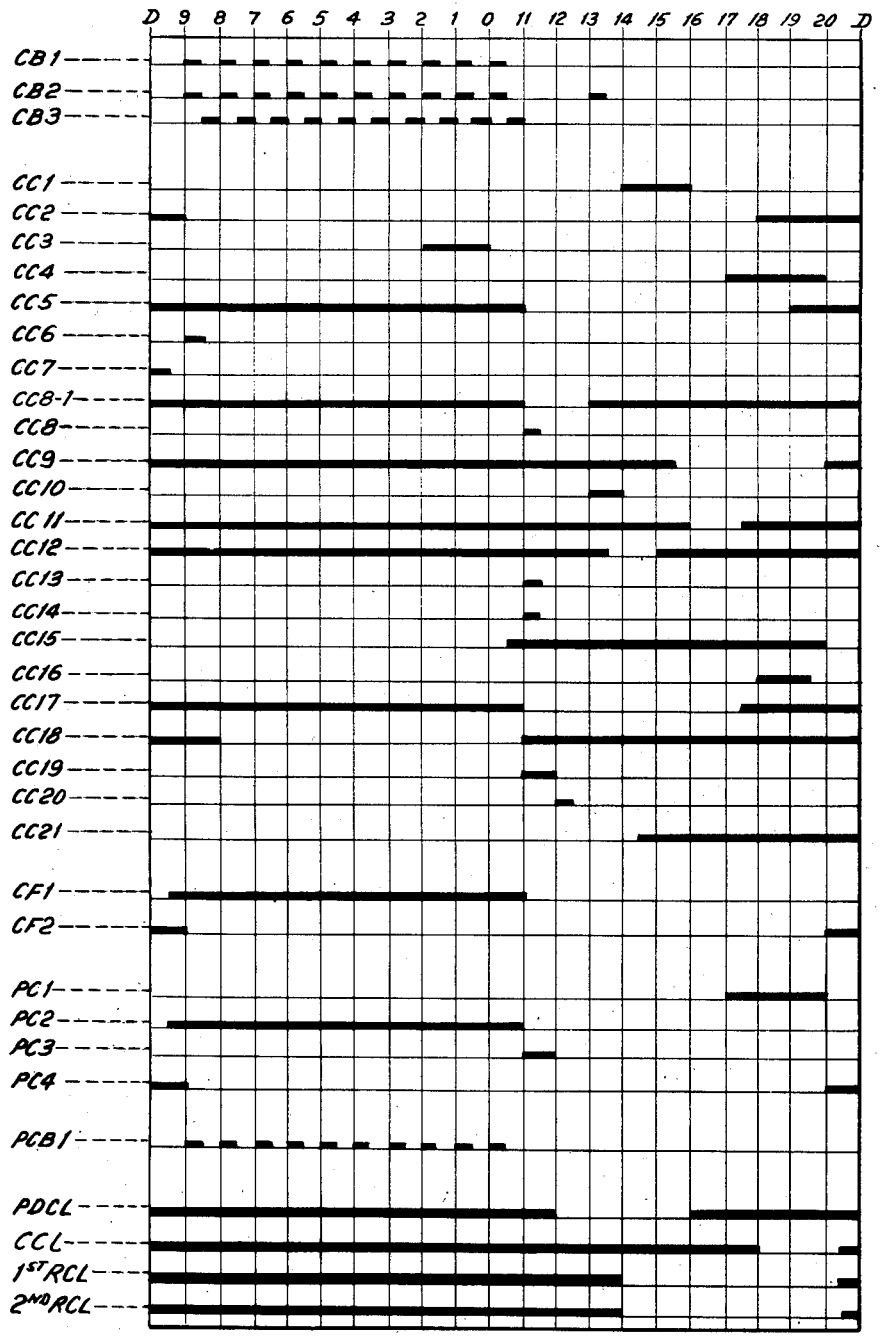
Fig. 8 is the cam chart.

It is sometimes desirable to punch a plurality of total cards for each type of control break. The plug hubs 236 and 238 control the number of cards to be punched (236 causes one card to be punched and 238 causes two cards to be punched). If it is desired to punch one card for each class of control break, the plug hubs 237 and 239 are both plugged to plug hub 236. If two cards are to be punched then the plug hubs 237 and 239 are both plugged to the plug hub 238. One typical example of such an operation is to punch one total card for each minor control break and two total cards for each major control break. In order to have the machine function in this manner at the respective control breaks, it is necessary to plug connect plug hub 236 to 237 and 238 to 239. During the checking cycle which follows each punching cycle the relay R-18 is energized and its contacts R-18c, R-18d, R-18e, R-18f, R-18g are closed. If two cards are to be punched, the first card punched will close the CCL contact at a half point before "D" (see timing chart) and contact will remain closed until the second card has passed the checking station and then the CCL contact will open at the 18th point of the cycle. If the card just punched (i. e., the minor total card) is found to be correct, the relay R-19 will not be energized (checking for multiple cards to be described later) and upon closure of the cam contact CC-19 a circuit is completed through the advancing coil of the stepping relay #2 as follows: Line 200 (Fig. 7E), the cam contact CC-19, R-18f, R-19f advancing coil, and to the line 201. Shortly after the cam contact CC-19 opens, the cam contact CC-20 closes and a circuit will be completed through the R-42 relay coil as follows: Line 200, the cam contact CC-20, R-18g, stepping relay #2, bank #1, first point, plug hub 236, plug wire, plug hub 237, R-30n (now transferred), coil of relay R-42, and to the line 201. Energization of relay R-42 closes its R-42a point and opens its R-42b, R-42c points. Closure of R-42a completes a holding circuit for the relay R-42 as follows: Line 200, R-18e (now closed), R-42a, the coil of relay R-42, and to the line 201. The opening of R-42c (Fig. 7D-1) permits the dropping out of the relay R-30 upon opening of the cam contact CC-11.

When the relays R-30, R-31 are energized, the condensers 240 and 242 (Fig. 7E) are discharged through the resistors 241 and 243 respectively by the transferring of the contacts R-30m, R-31m, respectively. Now upon the dropping out of the relay R-30, the contact R-30m is returned to normal and the relay R-43 is energized momentarily by the charging current of the condenser 240. The momentary energization of the relay R-43 closes its R-43a, R-43b points. Closure of the R-43b points completes a circuit through the reset coil of the stepping relay #2 thus resetting the stepping relay. If two cards are fed consecutively, R-18 will stay picked up because the card contact will overlap the second card. If only one card is being fed, it holds for one cycle and then drops out. At the completion of the checking cycle, after the card leaves the checking station, card contact CCL opens causing relay R-18 to deenergize. Deenergization of relay R-18 accordingly opens R18e contact and thus opens the holding circuit for relay R-42, permitting it to drop out. Following the checking of the minor total punched card, a punching cycle is again initiated in which the major total data is punched in the card and then checked. During this cycle if the punched data is found to be correct, a circuit is completed through the advancing coil of stepping relay #2 as previously described, advancing the stepping relay contacts to their first contact position. Upon closure of the cam contact CC-20, this time, there is no circuit completed because the contact R-30n has been returned to normal position. Thus the relay R–31 is prevented from dropping out when the cam contact CC–12 opens by the closed shunting contacts R–42b and R–5b; accordingly, at the end of the checking cycle the relay contact R–31a is still closed. The contact R–36a is closed by the opening of the R–36 relay holding circuit at the beginning of the checking cycle, and upon closure of the cam contact CC–2 the punch clutch magnets 120 and 163 are again energized and a second major total card is punched and checked. During the second checking cycle, upon closure of the cam contact CC–19 the advancing coil of stepping relay #2 is again energized advancing the stepping relay contacts to their second contact position. This time upon closure of the cam contact CC–20 a circuit is completed through the coil of relay R–42 as follows: Line 200, cam contact CC–20, R–18g, stepping relay #2, bank #1, second contact position, plug hub 238, plug wire, plug hub 239, R–31n (now closed), R–30n (normally closed), R–42 coil, and to the line 201. The holding circuit is established for the relay R–42 through R–18e and R–42a contacts as previously described. Now upon the opening of the cam contact CC–12 the contacts R–42b and R–30k, are all open and the holding circuit for the relay R–31 is opened, thus permitting the relay to drop out.

Checking of total card punching

Each punching operation is followed by a checking cycle in which the card just punched is checked against the accumulator from which it was punched. The checking of single total cards may be effected by subtracting the amounts punched in the card from the accumulators from which the card was punched. If the card was punched correctly the accumulator will be restored to zero setting.

The card which has just been punched advances to the checking station, and as it is fed between the contact roll 40 and brushes 39 the CCL contact is closed and energizes the relay R–18, opening its R–18a, R–18b contacts and closes its R–18c contact.

Additional plug connections are required for the checking operation as follows: From plug hub 206 to plug hub 236 (Fig. 7B), plug hub 216 to plug hub 217 (Fig. 7C), plug hub 218 to plug hub 219, plug hub 220 to plug hub 221, plug hub 221 to plug hub 222, plug hub 223 to plug hub 224 (Fig. 7A), and plug hub 225 to plug hub 226.

Near the end of the punching cycle the R–6 relay is energized by the closure of the cam contact PC–1 which completes a circuit through the pick-up coil of the relay R–6. Energization of the R–6 relay closes its R–6a, R–6b contacts. Closure of contact R–6a completes a holding circuit for the R–6 relay as follows: Line 200, CC–5, R–6a, R–6 holding coil, and to the line 201. Closure of R–6b contact completes a circuit through the R–7 relay coil and the R–11 relay coil as follows: Line 200, R–6b, R–30f (now transferred) plug hub 223, plug wire, plug hub 224, coil of R–11 and hold coil R–7 relays to line 201. Energization of the R–7 and R–11 relays closes their associated a, b, c and d contacts in the accumulator #1 circuit (Fig. 7B). At the start of the checking cycle, "D" time, the accumulator add magnets are all energized by the closure of the cam contact CC–7 through the contacts R–7a, R–7b, R–7c, and R–7d. As the card is fed past the checking station the differently timed pulses, produced through the holes in the card are directed to the accumulator subtraction magnet, thus stopping the rotation of the counter wheels, and if the holes in the card are in agreement with the amount in the accumulator, the accumulator will now be returned to zero setting.

The circuits for one order will now be described. Assuming that a "7" is recorded in the units order of counter #1, then a "7" will be punched in the units order of the related field in the card. As the punched card is fed past the checking station, the accumulator wheel is started rotating at "D," which is one point before "9," by the energization of the add magnet from line 200, through cam contact CC–7, R–7a, counter add magnet, and to line 201. At the "7" time a circuit will be completed, through the "7" hole punched in the card, through the counter subtraction magnet via the following circuit: Line 200, CB–1, R–18c, contact roll 40, through the hole in the card, brush 39, plug hub 206, plug wire, units order plug hub 236, R–11a, accumulator subtraction magnet, to line 201. Thus the accumulator wheel which was setting at the "7" position will have been advanced three points and will be declutched at "0" setting.

Shortly after the accumulator entry portion of the checking cycle, the cam contact CC–8 closes to test the accumulator settings and determine if it has been returned to zero or not. If it has been returned to zero the closing of the cam contact CC–8 will not complete a circuit. If, however, any one of the accumulator positions fails to be returned to zero then a circuit will be completed through the pick-up coil of the relay R–19 (Fig. 7C) upon closure of the cam contact CC–8 as follows: Assuming that the units order of accumulator #1 was not returned to zero, line 200, cam contact CC–8, R–18d, R–30e (now transferred), plug hub 216, plug wire, plug hub 217, readout common (highest order), readout brush to the highest order zero segment, readout common, readout brush, zero segment, readout common, readout brush of the tens order, zero segment of the tens order, readout common of the units order, readout brush of the units order, to one of the digit segments 1–9 inclusive, back to the 1 digit segment, across the 1 digit segments to the hundreds order, down the digit segments of the hundreds order to plug hub 220, plug wire, plug hub 221, plug wire, plug hub 222, R–19 pick-up coil, to line 201. Energization of the R–19 relay closes its contacts R–19a, R–19b, R–19c. Closure of R–19a completes a circuit through the R–19 holding coil as follows: Line 200, R–5c, R–19a, R–19 holding coil, and to the line 201. Thus, the relay R–19 will be held energized until the R–5c contact is opened by the energization of the relay R–5, to be described later. Closure of the contacts R–19b and R–19c prevents dropping out of the relays R–30, R–31 respectively, once they have been picked up, until after the error reset button has been operated.

If a card is found to have been punched in error, the machine will stop and the card on the top of the stack in the receiving hopper will be the one in error.

Checking of multiple punched total cards

Each multiple punching operation is also followed by a checking cycle in which the cards just punched are checked against the accumulator from which it was punched. The checking in this case must be effected by comparing the amount in the counter from which the card was punched with the amount punched in the card, a manner similar to that of comparing the controlling data in adjacent cards passing through the card feeding and analyzing unit for auto control. The accumulators, in this case, are not returned to zero during the checking operation.

Additional plug connections for multiple checking operations are required as follows: A plug connection between plug hubs 223 and 224 and between plug hubs 225 and 226, Fig. 7A; from plug hub 206 (Fig. 7B) of the total field to plug hubs 202, Fig. 7C-1, also from plug hubs 212 of the minor accumulator readout to plug hubs 216 of the minor readout control, from plug hubs 217 of the minor readout control to plug hub 203. Similarly, the major total readout plug hubs 212 are plug connected to the major readout control plug hubs 216 and from plug hubs 217 of the major readout control to plug hubs 203.

The card which has just been punched advances to the checking station, and as it is fed between the contact roll 40 and the brushes 39 the CCL contact is closed, energizing the relay R-18.

During the punch cycle the relay R-6 is picked up by the closure of PC-1 and is held over into the checking cycle by CC-5 through R-6a and the holding coil of relay R-6. Closure of R-6b completes a circuit through R-30f (now transferred), the R-11 coil thus holding R-11 energized during the checking cycle.

When a hole in the card presents itself between the sensing brush 39 and the contact roll 40, a circuit will be completed as follows: Line 200 (Fig. 7B), CB-1, R-18c, contact roll 40, hole in card, brush 39, plug hub 206, plug wire, plug hub 202, (Fig. 7C-1), pick-up coil of the related relays R-142, R-143, R-44 or R-45, to line 201. Assuming that there is a "5" in the units order of accumulator #1 and a "5" has been punched in the units order of the field in the total card, the circuit just described will occur at the "5" index time through the R-45 relay coil. Simultaneously, a circuit will be completed through the relay R-149 pick-up coil as follows: Line 200 (Fig. 7B), CB-1, R-18b (Fig. 7C-1), emitter "5" segment, units order "5" segment accumulator readout, plug hub 212, plug wire, plug hub 216, contact R-11a (now closed) plug hub 217, plug wire, plug hub 203, R-149 pick-up coil, and to line 201. The R-45 and R-149 relays are held energized by a circuit through their hold coils, contacts R-45a, R-149a, respectively, and the CF-1 cam contact. CB-3 closes during the last half of each index point from "9" through "0" and tests the continuity of each pair of contacts R-142b, R-46b—R-143b, R-47b—R-44b, R-148b—R-45b, and R-149b. If the hole in the card is in agreement with the data in the accumulator, the circuit through each pair of contacts will be maintained opened. If, however, there is a disagreement between the accumulator data and the data punched in the card in one or more columns, the higher number, appearing in each of the pairs of columns being compared, will cause the "b" contact of its related relay to be transferred and upon closure of CB-3 a circuit will be completed as follows: Assuming that a "4" hole is punched in units column and a "5" is in the units order of the accumulator, the R-45b contact will be transferred at the "5" time, but R-49b will be in its normal position and the circuit will be from line 200 (Fig. 7D-1), CB-3, R-45b (now transferred) (Fig. 7C-1), R-149b, R-19 relay pick-up coil to line 201. Energization of R-19 relay closes its R-19a, R-19d, R-19e contacts, transfers its R-19f contacts and opens its R-19g contacts. Closure of contacts R-19a establishes a holding circuit as follows: Line 200, (Fig. 7C-1), PC-4, R-5c, R-19a, R-19 holding coil, to line 201. Closure of R-19d completes a circuit through the pocket selector magnet 49 and causes the card to be directed to the pocket 43 if the plug hubs 233, 234 are plug connected.

Closure of R-19e completes a circuit through the R-41 relay coil upon closure of the cam contact CC-10 if the stepping relay #1 has been advanced three steps. The transferring of R-19f contact prevents the circuit being completed through the stepping relay #2 and causes a circuit to be completed through stepping relay #1 when the cam contact CC-19 closes; the opening of R-19g prevents the circuit being completed through the reset control relays. If the card has been found to be in error, it is directed to the reject pocket 43 and a second punch cycle is initiated punching the same data in this second card. The second punching cycle is followed by a checking cycle, and if this second card is found to be punched in error a third punching cycle and a third check cycle is initiated. If this third card is found to be in error the machine stops. This is accomplished as follows: During each checking cycle upon closure of the cam contact CC-19, if the card is found to be in error, a circuit is completed from the line 200 (Fig. 7E), the cam contact CC-19, R-18f (now closed), R-19f (now transferred), stepping relay #1 advancing coil, and to the line 201. Shortly after the stepping relay #1 has been advanced to its third position, a circuit is completed through the coil of relay R-41 upon closure of the cam contact CC-10 as follows: Line 200 (Fig. 7D-1), CC-10, R-19e (now closed) (Fig. 7E), third contact position stepping relay #1, R-5g, R-41 coil to line 201. Energization of relay R-41 closes the R-41a contact and opens the R-41b contact. Closure of R-41a completes a hold circuit for relay R-41 as follows: Line 200, R-41a (now closed), R-5g, R-41 coil to line 201. Opening of R-41b (Fig. 7A) drops out the R-2 relay opening its R-2b contact and preventing any further energization of the clutch magnets, thus stopping the machine.

*Error resetting*

In order to resume machine operations after the machine has been stopped because of error discovered during checking by subtraction from the accumulators as in single total card checking, it will first be necessary to reset the accumulator from which the data has been erroneously punched. In this case the indication of disagreement was the fact that the accumulator was not restored to zero status. This resetting operaton is initiated by depressing the error reset key and closing its contact. With the error reset key closed, closure of cam contact CC-4 will energize the relay R-5 by the following circuit: Line 200, error reset key contact, cam contact CC-4, R-4b, R-5 pick-up coil, and to the line 201. Energization of the relay R-5 opens its R-5a, R-5b, R-5c contacts and closes its R-5d, R-5e, R-5f contacts. Closure of R-5e contact completes a circuit through the R-5 holding coil as follows: Line 200, cam contact CC-5, R-5e, R-5 holding coil, and to the line 201. With the R-5d contact closed the R-4 relay will be energized upon closure of the cam contact CC-3 as follows: Line 200, cam contact CC-3, R-5d, R-4 pick-up coil, and to the line 201. Energization of R-4, closes R-4a and opens R-4b contacts. Closure of R-4a completes a circuit through the R-4 holding coil as follows: Line 200, error reset key contact, R-4a, R-4 holding coil, and to the line 201. Opening of R-4b prevents reenergization of the relay R-5 upon closure of the cam contact CC-4 should the error reset key be held depressed.

Closure of the R-5f contact completes a circuit to energize the R-7 and R-8 relays as follows: Line 200, R-5f, R-30g (now transferred), plug hub 227, plug wire, plug hub 228, R-7 pick-up coil and R-8 coil to line 201. Energization of the relays R-7 and R-8 causes their associated contacts a, b, c, and d to close. With the contacts R-7a, R-7b, R-7c and R-7d closed, the accumulator add magnets will be energized at the "D" time by the closure of the cam contact CC-7 as previously described, thus causing all of the accumulator wheels to start rotating. When an accumulator wheel goes through the "9" position to the "0" position, the accumulator carry contact "10" closes and completes a circuit through the accumulator subtraction magnet as follows: Line 200, CB-2, accumulator carry contacts "10" (counter #1 units order), R-8a, accumulator subtraction magnet, and to the line 201. Energization of the accumulator subtraction magnet stops the rotation of the accumulator wheel and the accumulator carry contact causes it to stop when it comes to its "0" position.

The energization of the relay R-19 previously described closes its contacts R-19b, R-19c. The closure of these contacts prevents the dropping out of the relays R-30, R-31, following the checking of a minor or major total punched card, if that card is found to be in error. The relays R-30 and R-31 are then dropped out during the reset cycle for the respective reset operation by opening of the contacts R-5a, and R-5b respectively. Assuming that a minor total card has been found to be punched in error then the relay R-19 is picked up and the contact R-19b is closed before the cam contact CC-11 opens. The contact R-18a is opened at this time, but since R-19b is closed the relay R-30 is not deenergized. Upon depressing the error reset key the relay R-5 is energized as previously described opening the R-5a, R-5b, and R-5c contacts. This occurs before the cam contacts CC-11 and CC-12 open so that the relay R-19 has time to drop out, opening the contacts R-19b and R-19c; the contacts R-5a and R-5b being opened when the cam contacts CC-11, CC-12 open, the respective relay R-30, R-31 will be deenergized.

If it is desired to feed the total and the detail cards into separate hoppers, a plug connection is made between plug hub 231 and plug hub 232 (Fig. 7D). This will energize the magnet 48 and cause all of the punched total cards to be directed to pocket 42. When the magnet 48 is energized it will draw down sorter blade 44 (Figs. 1A and 3), thereby directing the card into the pocket 42.

If it is desirous of having the total cards, found to have been punched erroneously, fed into a separate pocket a plug connection is made between plug hub 233 and 234. When a total card is found to have been punched in error, the relay R-19 is energized and closes its R-19d contacts, thus the sort magnet 49 will be energized and the card will be directed to the reject pocket 43. When the sorter magnet 49 is energized it will draw down sorter blades 44 and 45. The magnet acts directly on blade 45 but because of the fact that the blade 45 has a portion in contact with the blade 44 (Fig. 3) the blade 44 will also be pulled down when the magnet 49 is energized. With both blades 44 and 45 down, the card will be directed into the reject pocket 43.

Subtraction

The plugging required for subtraction is the same as for adding with one additional plug wire required for each accumulator unit. The additional plug wire is from the control column plug hub 204 to the subtraction control plug hub 235 (Fig. 7E) for the associated accumulator. When an "X" hole appears in the subtraction control column for a field of the card which is being entered into an accumulator (assuming accumulator #1), then there will be a circuit completed through the R-37 relay pick-up coil as follows: Line 200, CB-1, R-16a, contact roll 26, the hole in the card, brush 25, control column plug hub 204, plug wire, plug hub 235 (accumulator #1), cam contact CC-13, R-37 pick-up coil to line 201. Energization of R-37 closes its R-37a, R-37b contacts. Closure of R-37a completes a circuit through the R-37 holding coil through the cam contact CC-15, closing of contact R-37b, and completes a circuit through the pick-up coil of relay R-39 upon closure of the cam contact CC-16. Energization of the relay R-39 transfers its contacts R-39b, R-39c, R-39d, and R-39e, and closes its contacts R-39a, R-39f, R-39g, R-39h and R-39j. The closure of R-39a completes a circuit through the holding coil of relay R-39 through the closed cam contact CC-17. The closed contacts R-39f, R-39g, R-39h, R-39j complete circuits to the add magnets through the carry control contacts (A side) when the cam contact CC-6 closes, thus starting all of the accumulator wheels rotating at the "9" time. The differentially timed pulse is directed to the subtraction magnets through the transferred R-39b, R-39c, R-39d, and R-39e contacts. The differentially timed pulse from the card will then stop the accumulator wheels rotation and cause a nines complement to be added into the accumulator. (The Crompton method of subtraction is used.)

Counter reset after punching multiple total cards

After the desired number of cards have been punched and checked for a particular class of total, that class of total accumulator is reset as follows: During the last checking cycle the relay R-42 is energized closing the R-42d contact and the following circuit is completed upon closure of the cam contact CC-10 (Fig. 7D-1): Line 200, cam contact CC-10, R-42d (now closed), R-18d (now closed), R-19g, R-30g (now transferred) (Fig. 7A), plug hub 227, plug wire, plug hub 228, R-7 pick-up coil and R-8 coil, and to the line 201. A holding circuit is established through R-8f contact and CC8-1. With relay R-7 energized the contacts R-7a, R-7b, R-7c, and R-7d are closed, and upon closure of CC-7 a circuit is completed through all of the accumulator #1 add magnets. As each of the accumulator wheels is rotated through 9 to 9 position, its 10 carry contact closes and upon closure of CB-2 a circuit is completed through its subtraction magnet as follows: Line 200 (Fig. 7B), CB-2, 10 contact now closed, R-8a, R-8b, R-8c or R-8d contact accumulator subtraction magnet, and to the line 201, thus stopping the accumulator wheel at its "0." CC8-1 opens at the "11" index point and drops out the relays R-7 and R-8.

The manner in which the machine operates to perform its several functions has been developed as the description proceeded. It is, therefore, deemed unnecessary to indulge in a further summary at this point, it being sufficient to say that the various devices comprising the machine may

We claim:

1. In a record card totaling and reproducing machine, data accumulators, a detail card sensing station, means in said station for controlling said data accumulators, a total card reproducing station, means in said reproducing station under control of said accumulators for reproducing totals set up in said accumulators, means in said card sensing station for initiating total reproducing in said reproducing station, means in said reproducing station for verifying totals reproduced in cards in said station, a plurality of card receiving stations, means for delivering detail cards from said card sensing station to one of said card receiving stations, means for delivering total cards from said total card reproducing station to said detail card receiving station, and means for delivering cards erroneously produced in said reproducing station to another of said card receiving stations.

2. In a record card totaling and reproducing machine, data accumulators, a detail card sensing station, means in said station for controlling said data accumulators, a total card reproducing station, card punching mechanism in said reproducing station under control of said accumulators for punching totals set up in said accumulators, means in said card sensing station for initiating total reproducing in said reproducing station, means in said reproducing station for verifying totals reproduced in cards in said station, a plurality of card receiving stations, means for delivering detail cards from said detail card sensing station to one of said card receiving stations, means for delivering total cards from said total card reproducing station to said detail card receiving station, and means for delivering cards erroneously produced in said reproducing station to another of said card receiving stations.

3. In a record card totaling and reproducing machine, data accumulators, a detail card sensing station, means in said station for controlling said data accumulators, a total card reproducing station, means in said reproducing station under control of said accumulators for the multiple reproduction of totals set up in said accumulators in a plurality of cards, means in said card sensing station for initiating total reproducing in said reproducing station, a card receiving station, means for delivering detail cards from said detail card sensing station to said card receiving station, means for delivering a total card from said total card reproducing station to said detail card receiving station, and means for delivering a second total card reproduced in said reproducing station to a total card receiving station.

4. In a record card totaling and reproducing machine, data accumulators, a detail card sensing station, means in said station for controlling said data accumulators, a total card reproducing station, a card punching mechanism in said reproducing station under control of said accumulators for the multiple punching of totals set up in said accumulators in a plurality of cards, means in said card sensing station for initiating total reproducing in said reproducing station, a card receiving station, means for delivering detail cards from said detail card sensing station to said card receiving station, means for delivering a total card from said total card reproducing station to said detail card receiving station, and means for delivering a second total card reproduced in said reproducing station to a total card receiving station.

5. In a record card totaling and reproducing machine, data accumulators, a detail card sensing station, means in said station for controlling said data accumulators, a total card reproducing station, means in said reproducing station under control of said accumulators for reproducing totals set up in said accumulators in a plurality of total cards, means in said card sensing station for initiating total reproducing in said reproducing station, means in said reproducing station for verifying each of a plurality of total cards, a plurality of card receiving stations, means for delivering detail cards from said detail card sensing station to one of said card receiving stations, means for delivering a total card from said total card reproducing station to said first named card receiving station, and means for delivering a total card from said reproducing station to another of said card receiving stations.

6. In a record card totaling and reproducing machine, data accumulators, a detail card sensing station, means in said station for controlling said data accumulators, a total card reproducing station, card punching mechanism in said reproducing station under control of said accumulators for punching totals set up in said accumulators in a plurality of total cards, means in said card sensing station for initiating total reproducing in said reproducing station, means in said reproducing station for verifying each of a plurality of total cards, a plurality of card receiving stations, means for delivering detail cards from said detail card sensing station to one of said card receiving stations, means for delivering a total card from said total card reproducing station to said first named card receiving station, and means for delivering a total card from said reproducing station to another of said card receiving stations.

7. In a record card totaling and reproducing machine, data accumulators, a detail card sensing station, means in said station for controlling said data accumulators, a total card reproducing station, card punching mechanism in said reproducing station under control of said accumulators for punching totals set up in said accumulators in a plurality of total cards, means in said card sensing station for initiating total reproducing in said reproducing station, means in said reproducing station for verifying each of a plurality of total cards, a plurality of card receiving stations, continuously rotating card feeding rollers for delivering detail cards from said detail card sensing station to one of said card receiving stations, continuously rotating card feeding rollers for delivering a total card from said total card reproducing station to said first named card receiving station, and means for delivering a total card from said reproducing station and through said last named feed rollers to another of said card receiving station.

8. In a record card totaling and reproducing machine, data accumulators, a detail card sensing station, means in said sensing station for controlling said data accumulators, a total card reproducing station, means in said reproducing station under control of said accumulators for reproducing totals set up in said accumulators, means in said card sensing station for initiating total reproducing in said reproducing station, a pair of card receiving stations, means for delivering detail cards from said detail card sensing station to one of said card receiving stations, and means in said total card delivery means for selectively delivering a card on which a total has been reproduced into the detail card receiving station or into a separate total card receiving station.

9. In a record card totaling and reproducing machine, data accumulators, a detail card sensing station, means in said sensing station for controlling said data accumulators, a total card reproducing station, a card punching mechanism in said reproducing station under control of said accumulators for punching totals set up in said accumulators, means in said card sensing station for initiating total reproducing in said reproducing station, a pair of card receiving stations, means for delivering detail cards from said detail card sensing station to one of said card receiving stations, and means in said total card delivery means for selectively delivering a card on which a total has been reproduced into the detail card receiving station or into a separate total card receiving station.

10. In a record card totaling and reproducing machine, data accumulators, a detail card sensing station, means in said sensing station for controlling said data accumulators, a total card reproducing station, a card punching mechanism in said reproducing station under control of said accumulators for punching totals set up in said accumulators, means in said card sensing station for initiating total reproducing in said reproducing station, a pair of card receiving stations, means for delivering detail cards from said detail card sensing station to one of said card receiving stations, and delivery selection blades in said total card delivery means for selectively delivering a card on which a total has been reproduced into the detail card receiving station or into a separate total card receiving station.

11. In a record card totaling and reproducing machine, data accumulators, a detail card sensing station, means in said station for controlling said data accumulators, a total card reproducing station, card punching mechanism in said reproducing station under control of said accumulators for punching totals set up in said accumulators, means in said card sensing station for initiating total reproducing in said reproducing station, clutch controlled means for periodically feeding total cards into said reproducing station, clutch controlled means for progressively feeding detail cards into said sensing station, a card receiving station, means for delivering detail cards from said detail card sensing station to said card receiving station, means for delivering total cards from said total card reproducing station to said card receiving station, and means independent of said clutches for continuously operating said detail card and said total card delivery means.

12. In a record card totaling and reproducing machine, data accumulators, a detail card sensing station, means in said sensing station for controlling said data accumulators, a total card reproducing station, means in said reproducing station under control of said accumulators for reproducing totals set up in said accumulators in a plurality of total cards, means in said card sensing station for initiating total reproducing in said reproducing station, means in said reproducing station for verifying totals of a plurality of total cards against said accumulators while maintaining the totals therein, means for resetting said accumulators after total cards have been verified, a card receiving station, means for delivering detail cards from said detail card sensing station to said card receiving station, and means for delivering total cards from said total card reproducing station to said card receiving station.

13. In a record card totaling and reproducing machine, data accumulators, a detail card sensing station, means in said sensing station for controlling said data accumulaors, means for progressively feeding detail cards through said sensing station, a total card reproducing station, card punching mechanism in said reproducing station under control of said accumulators for punching totals set up in said accumulators in a plurality of total cards, means in said card sensing station for initiating total reproducing in said reproducing station, means for feding cards into said reproducing station at periodic intervals, means in said reproducing station for verifying totals of a plurality of total cards against said accumulators while maintaining the totals therein, means for resetting said accumulators after total cards have been verified, a card receiving station, means for delivering detail cards from said detail card sensing station to said card receiving station, means for delivering total cards from said total card reproducing station to said card receiving station, and means independent of said means for feeding cards into said sensing station and said reproducing station for controlling the means for delivering cards to said card receiving station.

14. In a record card totaling and reproducing machine, data accumulators, a detail card sensing station, means in said station for controlling said data accumulators, a total card reproducing station, means in said reproducing station under control of said accumulators for reproducing totals set up in said accumulators in a plurality of total cards, means in said card sensing station for initiating total reproducing in said reproducing station, means in said reproducing station for verifying totals of a plurality of total cards against said accumulators while maintaining the totals therein, means for resetting said accumulators after total cards have been verified, a plurality of card receiving stations, means for delivering detail cards from said detail card sensing station to one of said card receiving stations, and means for delivering a total card from said total card reproducing station to said detail card receiving station and for delivering another total card to a second card receiving station.

15. In a record card totaling and reproducing machine, data accumulators, a detail card sensing station, means in said station for controlling said data accumulators, a total card reproducing station, a card punching mechanism in said reproducing station under control of said accumulators for punching totals set up in said accumulators in a plurality of total cards, means in said card sensing station for initiating total reproducing in said reproducing station, means in said reproducing station for verifying totals of a plurality of total cards against said accumulators while maintaining the totals therein, means for resetting said accumulators after total cards have been verified, a plurality of card receiving stations, means for delivering detail cards from said detail card sensing station to one of said card receiving stations, and means for delivering a total card from said total card reproducing station to said detail card receiving station and for delivering another total card to a second card receiving station.

16. In a record card totaling and reproducing machine, data accumulators, a detail card sensing station, means in said station for controlling said data accumulators, a total card reproducing station, a card punching mechanism in said reproducing station under control of said accumulators for punching totals set up in said accumulators in a plurality of total cards, means in said card sensing station for initiating total reproducing in said reproducing station, means in said reproducing station for verifying totals of a plurality of total cards against said accumulators while maintaining the totals therein, means for resetting said accumulators after total cards have been verified, a plurality of card receiving stations, means for delivering detail cards from said detail card sensing station to one of said card receiving stations, means for delivering a total card from said total card reproducing station to said detail card receiving station and for delivering another total card to a second card receiving station, separate means for feeding cards to said detail card sensing station and to said total card reproducing station, and means independent of said separate card feeding means for controlling said means for delivering cards to said card receiving station.

17. In a record card totaling and reproducing machine, a data accumulator, a detail card sensing station, means in said station for controlling said data accumulator, a total card reproducing station, means in said reproducing station under control of said accumulator for reproducing totals set up in said accumulator, means in said card sensing station for initiating total reproducing in said reproducing station, means for periodically feeding total cards into said reproducing station, means for progressively feeding detail cards into said sensing station, a card receiving station, means for delivering detail cards from said detail card sensing station to said card receiving station, means for delivering total cards from said total card reproducing station to said card receiving station, means in said sensing station for disabling its card feeding means to interrupt feed of detail cards thereto during total reproducing in said reproducing station, and means in said reproducing station to render active said means for feeding detail cards into said sensing station after a total reproducing operation in said reproducing station.

18. In a record card totaling and reproducing machine, a data accumulator, a detail card sensing station, means in said station for controlling said data accumulator, card punching mechanism in said reproducing station under control of said accumulator for punching totals set up in said accumulator, means in said card sensing station for initiating total punching in said reproducing station, means for periodically feeding total cards into said reproducing station, means for progressively feeding detail cards into said sensing station, a card receiving station, means for delivering detail cards from said detail card sensing station to said card receiving station, means for delivering total cards from said total card reproducing station to said card receiving station, means in said sensing station for disabling its card feeding means to interrupt feed of detail cards thereto during total reproducing in said reproducing station, and means in said reproducing station to render active said means for feeding detail cards into said sensing station after a total reproducing operation in said reproducing station.

ELIZABETH SNOW BRYCE,
THE NATIONAL NEWARK AND ESSEX BANKING COMPANY OF NEWARK,
By LESLIE P. DOUGLASS,
    *Vice President*,
Executors of the Estate of James W. Bryce, Deceased.
ARTHUR H. DICKINSON.

REFERENCES CITED

The following references are of record in the file of this patent:

UNITED STATES PATENTS

| Number | Name | Date |
| --- | --- | --- |
| 2,034,260 | Johnstone | Mar. 17, 1936 |
| 2,126,595 | Weinlich | Aug. 9, 1938 |
| 2,211,094 | Braun | Aug. 13, 1940 |
| 2,230,673 | Blakely et al. | Feb. 4, 1941 |
| 2,255,674 | McDonnell | Sept. 9, 1941 |
| 2,275,396 | Johnson | Mar. 3, 1942 |
| 2,379,828 | Rubidge et al. | July 3, 1945 |
| 2,442,970 | Carroll et al. | June 8, 1948 |